United States Patent [19]
Takagi

[11] Patent Number: 5,172,157
[45] Date of Patent: Dec. 15, 1992

[54] AUTOMATIC LIGHT ADJUSTMENT DEVICE FOR CAMERAS

[75] Inventor: Tadao Takagi, Yokohama, Japan

[73] Assignee: Nikon Corporation, Tokyo, Japan

[21] Appl. No.: 789,967

[22] Filed: Nov. 12, 1991

[30] Foreign Application Priority Data

Nov. 17, 1990 [JP] Japan ................................ 2-312487
May 23, 1991 [JP] Japan ................................ 3-147765

[51] Int. Cl.[5] .............................................. G03B 15/05
[52] U.S. Cl. .................................. 354/415; 354/416; 354/432
[58] Field of Search ............... 354/415, 416, 417, 429, 354/431, 432, 433

[56] References Cited

U.S. PATENT DOCUMENTS

| | | | |
|---|---|---|---|
| 4,690,536 | 9/1987 | Nakai et al. | 354/416 X |
| 4,705,382 | 11/1987 | Mukai et al. | 354/416 X |
| 4,746,947 | 5/1988 | Nakai | 354/416 X |
| 4,809,030 | 2/1989 | Takagi et al. | 354/416 X |
| 4,951,080 | 8/1990 | Sakamoto et al. | 354/416 X |
| 4,965,620 | 10/1990 | Takagi et al. | 354/416 |
| 5,006,879 | 4/1991 | Takagi et al. | 354/413 |
| 5,111,231 | 5/1992 | Tokunaga | 354/416 X |

FOREIGN PATENT DOCUMENTS 1-287538 11/1989 Japan .
2-88899 3/1990 Japan .

Primary Examiner—W. B. Perkey
Attorney, Agent, or Firm—Shapiro and Shapiro

[57] ABSTRACT

An automatic light adjustment device for cameras includes: a flashing device capable of effecting a preliminary and a main flashing; a photometer device, which performs divisional photometry on a field divided into a plurality of divisional areas at the time of the preliminary and main flashing of the flashing device, emitting photometry signals respectively corresponding to these areas; an area setting device, which makes a judgment, for each of the plurality of divisional areas, as to whether the level of the corresponding photometry signal at the time of the preliminary flashing is within a fixed range or not, judging the area to be one on which light adjustment is to be performed (an light-adjustment area) when the signal level is within the range, and judging it to be one which is to be excluded with respect to light adjustment (a non-light-adjustment area) when the signal level is out of the range; a discrimination device, which makes a judgment, for each of any non-light-adjustment areas detected, as to whether the level of the corresponding photometric signal at the time of the preliminary flashing is above or below the fixed range; and a light adjustment device, which determines a light adjustment condition for stopping the main flashing on the basis of the judgment results obtained by the discrimination device, stopping the main flashing when the photometry signals emitted at the time of the main flashing and corresponding to the light-adjustment areas have satisfied the light adjustment condition.

16 Claims, 17 Drawing Sheets

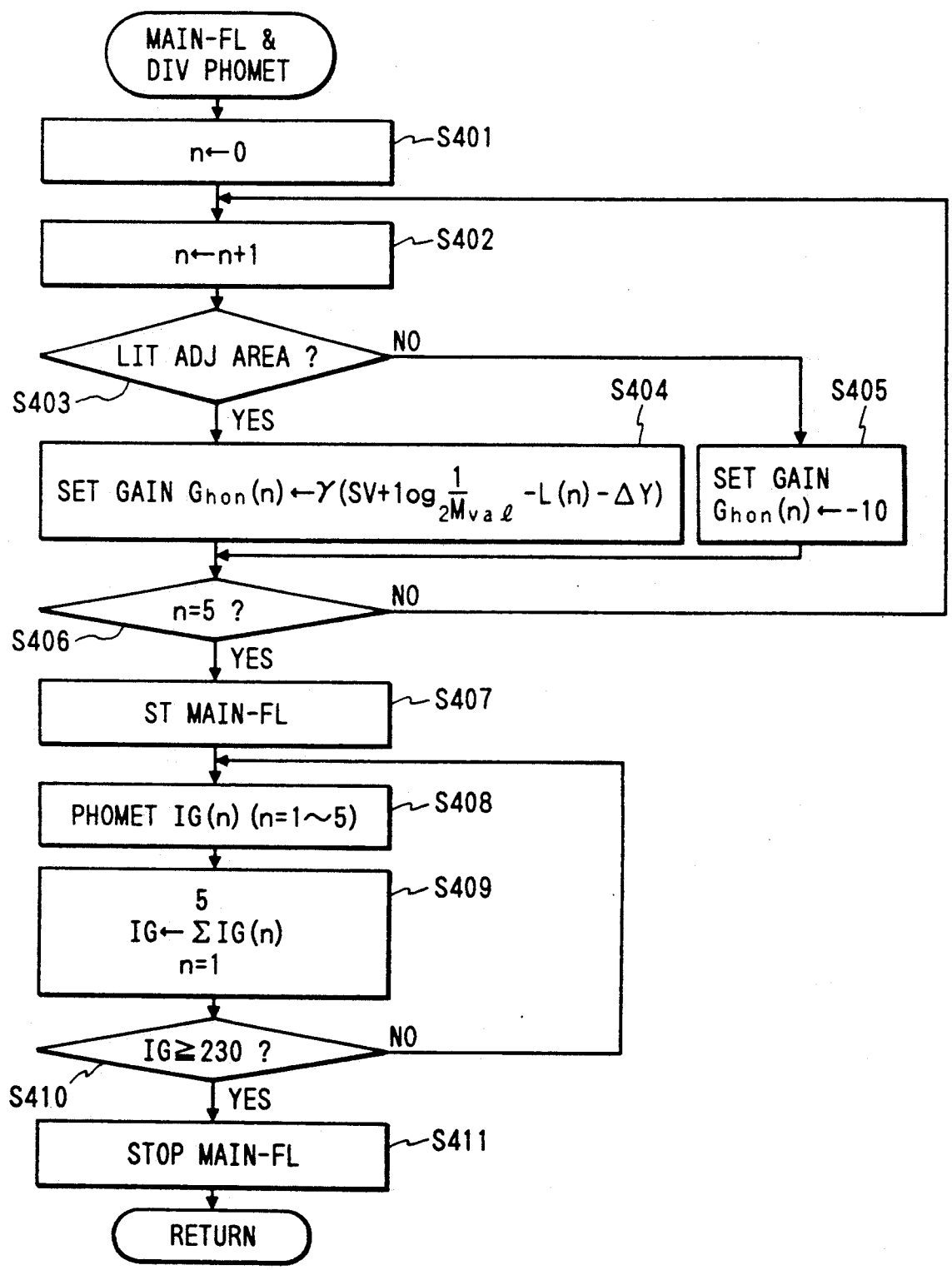

AUTOMATIC LIGHT ADJUSTMENT DEVICE FOR CAMERAS

BACKGROUND OF THE INVENTION

1. Field of the Invention

This invention relates to an automatic light adjustment device which carries out light adjustment in accordance with the results of a divisional photometry performed, at the time of flashing, on a field divided into a plurality of divisional areas.

2. Related Background Art

The present applicant proposed a TTL automatic light adjustment camera in the specification of U.S. patent Ser. No. 672,055; it is a camera capable of making a preliminary and a main flash and adapted to perform divisional photometry on a field divided into a plurality of photometric areas, at the time of preliminary flashing. Of the plurality of photometric areas, the ones whose photometry outputs (the levels of the corresponding photometric signals) are not within a fixed range (i.e., either above or below this fixed range) are regarded as areas on which light adjustment should not be performed and are excluded with respect to the light adjustment which is performed at the time of main flashing. This is, the instant at which the main flashing is to be stopped is determined exclusively on the basis of the photometric signals of those areas whose photometry outputs at the time of preliminary flashing are within a predetermined range (a light adjustment range). This arrangement provides the following advantage: If, for example, there exists in the field an object of high reflectance, such as a gold-leafed folding screen, or, if the background of the principal subject is missing, light adjustment is performed without taking into account the photometric signals of those areas corresponding to such an object or the missing background, with the result that the subject is more likely to be photographed with correct exposure.

The camera described above, however, is not able to adequately cope with a situation where all the photometric areas are to be excluded with respect to light adjustment; it is possible, in such a case, that correct exposure cannot be obtained. Further, even when it is only part of the photometric areas that is to be excluded, it may be difficult, in some cases, to obtain correct exposure solely by excluding such areas with respect to the light adjustment at the time of main flashing.

Another problem to be considered is that there are cases where object distance detection cannot be performed. This will happen, for example, when the AF (automatic focusing) adopted is of an in-lens-motor type and the photographic lens used is equipped with no distance encoder, or, even with an automatic focusing of an in-body-motor type, when the camera is used on a manual-focusing basis, or else, when a conventional photographic lens for MF (manual focusing) is used. In such cases, reflectance calculation cannot be performed, so that the extraction of any areas to be excluded (cut areas) is impossible or can only be effected inaccurately.

SUMMARY OF THE INVENTION

It is an object of this invention to provide an automatic light adjustment device for cameras which is improved in terms of its ability to provide correct exposure when there are photometric areas which are to be excluded with respect to light adjustment.

Another object of this invention is to provide an automatic light adjustment device for cameras in which the extraction of any photometric areas to be excluded (cut areas) can be effected with a high level of accuracy even when the object distance cannot be detected.

BRIEF DESCRIPTION OF THE DRAWINGS

FIGS. 1 to 9 are diagrams showing an embodiment of this invention; of which

FIG. 1 is a diagram illustrating the operation of a camera;

FIG. 2 is a perspective view showing the positional relationship between a condenser lens array, divisional photometer elements, and a film;

FIG. 3 is a block diagram showing the construction of the automatic light adjustment device for cameras of this invention;

FIG. 4 is a detailed circuit diagram showing the light adjustment circuit of this device;

FIG. 5 is a flowchart illustrating a main program;

FIGS. 6, 7, 8A, 8B and 9 are flowcharts showing sub-routine programs;

DESCRIPTION OF THE PREFERRED EMBODIMENTS

Figure 1:
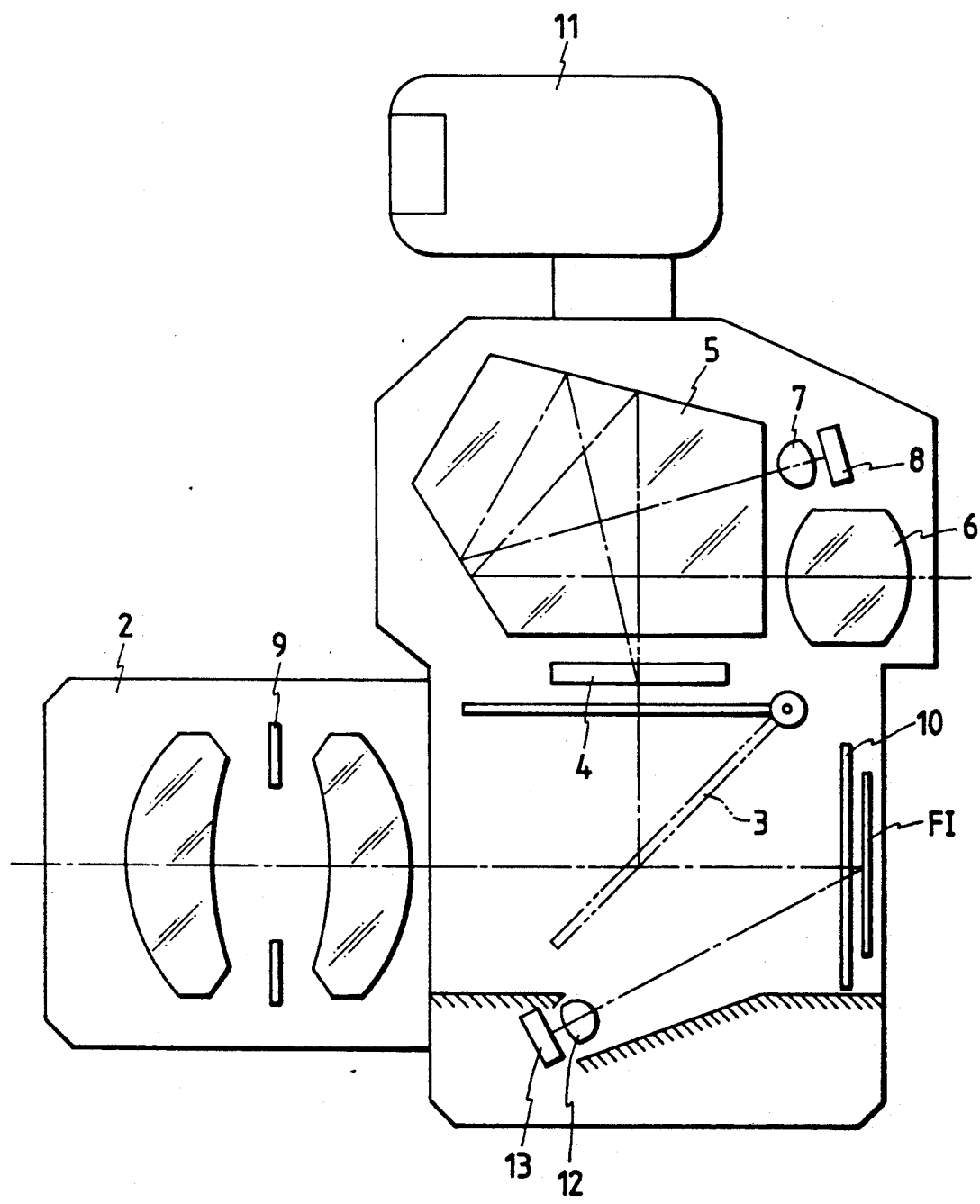
Figure 2:
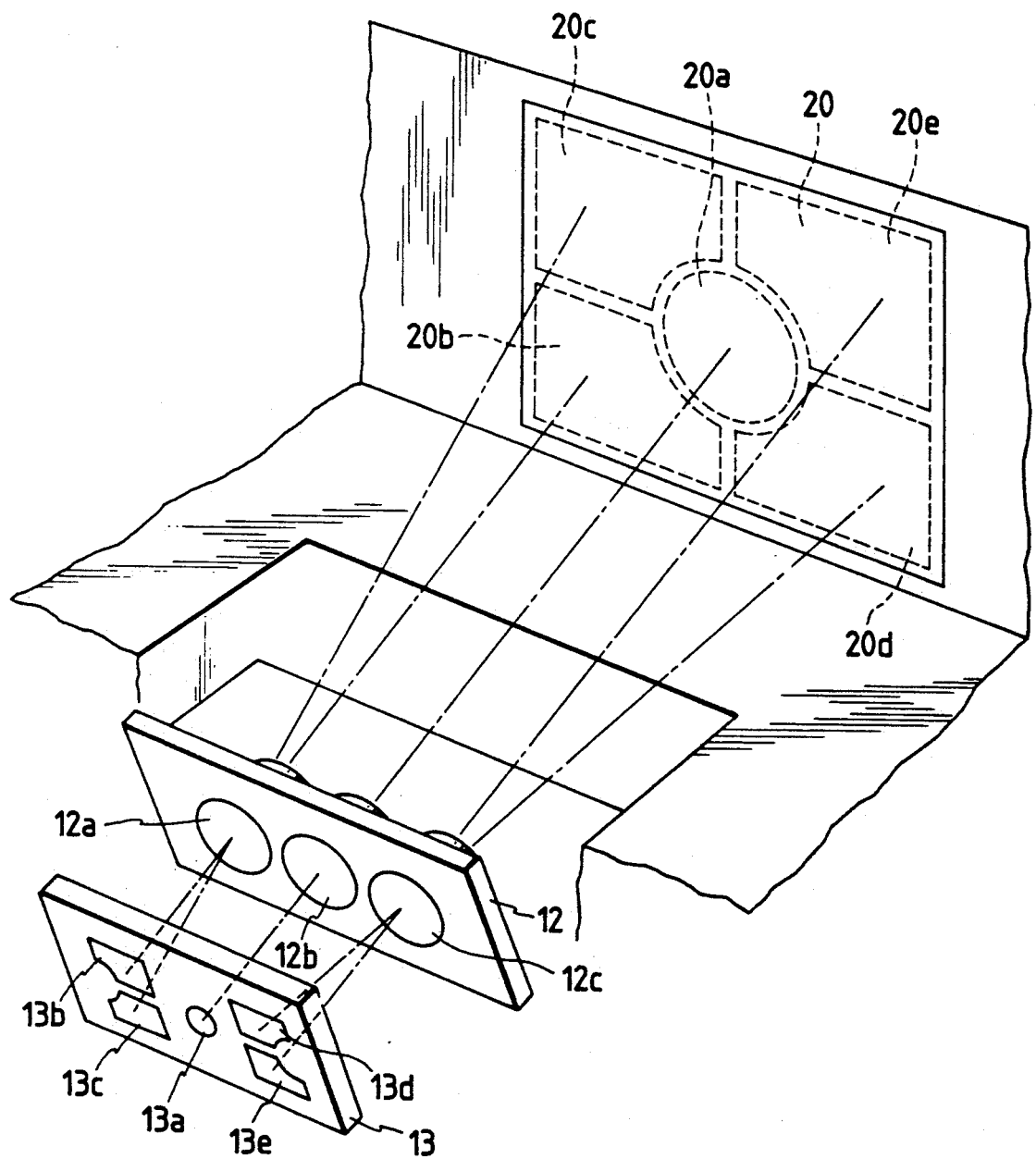
Figure 3:
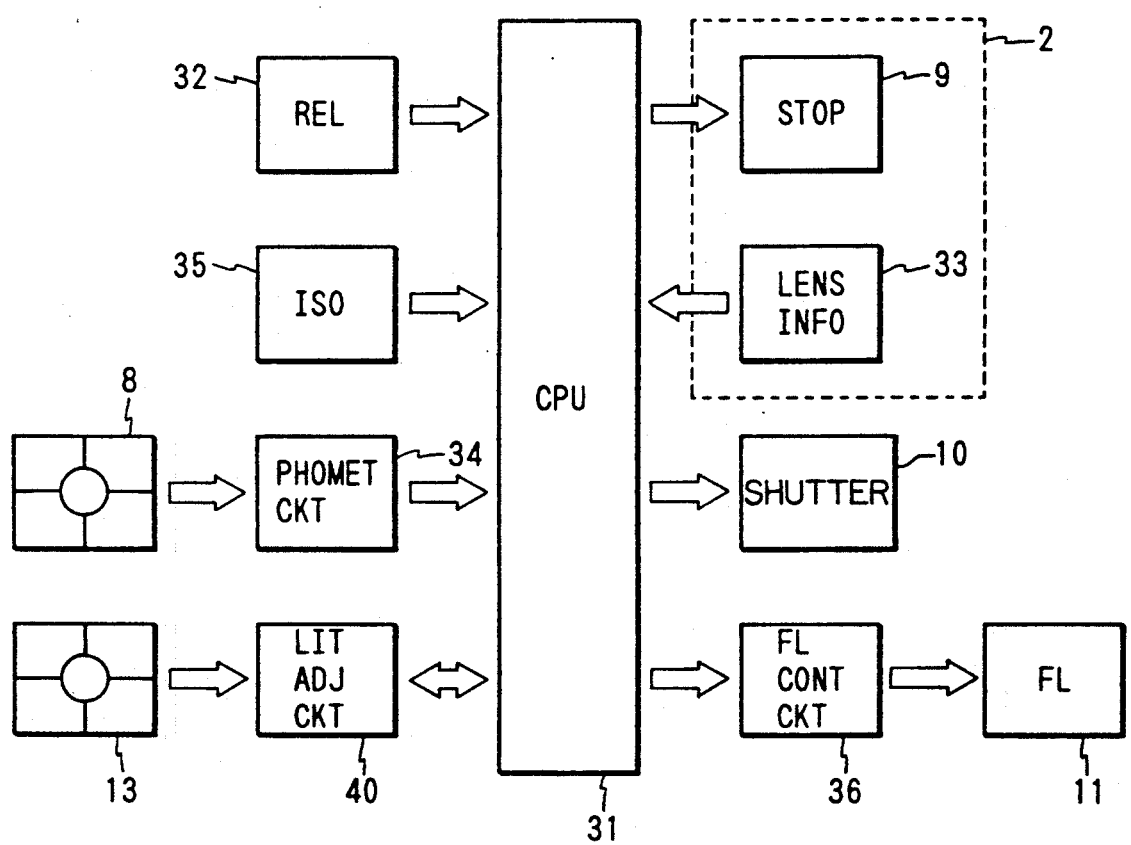
Figure 4:
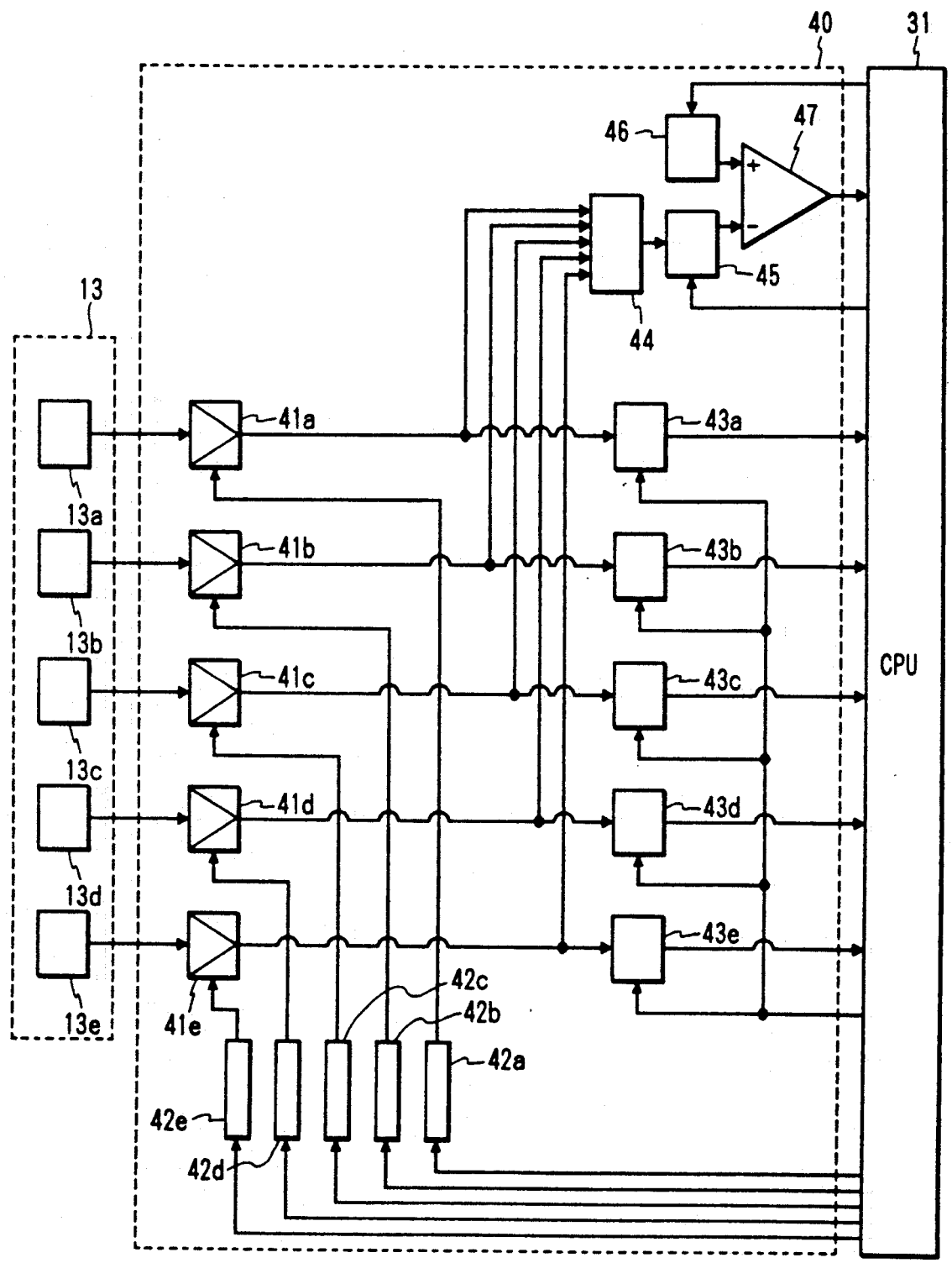

Embodiments of this invention will now be described in detail with reference to the accompanying drawings, etc. FIGS. 1 to 4 are diagrams showing an embodiment of the automatic light adjustment device for cameras of this invention, of which FIG. 1 is a sectional view of a TTL automatic light adjustment camera; FIG. 2 is a perspective view of the light-adjustment optical system of the camera; FIG. 3 is a block diagram showing the control system of the same; and FIG. 4 is a circuit diagram showing the light adjustment circuit of the same.

As shown in FIG. 1, the camera 1, to which the automatic light adjustment device of this embodiment is applied, is composed of a photographic lens 2, a mirror 3, a screen 4, a pentagonal 5, an eyepiece 6, a condenser lens 7, a photometer device 8, a stop 9, a shutter 10, an electronic flashing device 11, a condenser lens array 12, a photoreceptor device 13, etc.

Light (stationary light) having passed through the photographic lens 2 is reflected by the mirror 3 in its lowered position and transmitted through the screen 4 and the pentagonal 5 to be partly led to the eyepiece 6 and partly transmitted through the condenser lens 7 to the photometer device 8 for stationary photometry.

When a release button 32, shown in FIG. 3, is operated, the mirror 3 is moved to its raised position, with the stop 9 being narrowed down and the shutter 10 opened and closed. As a result, the subject light having passed through the photographic lens 2 is led to the film FI, which is thereby exposed.

When making a flash shot, the electronic flashing device 11 makes a main flash to illuminate the field after the shutter 10 has been opened, and the reflected light from the subject is transmitted through the photographic lens 2 to the film FI, from whose surface it is reflected again to be received by the photoreceptor device 13 for light adjustment through the condenser lens array 12.

Further, the camera of this embodiment is capable of making a preliminary flash for the purpose of examining the reflectance distribution of the field prior to the main flash mentioned above; before the shutter 10 is opened, the reflected light from the field due to this preliminary flashing is reflected by the reflection surface of the shutter 10 and received by the photoreceptor device 13. Since it is used as the surface for reflecting the light due to the preliminary flashing, the reflection surface of the shutter 10 is made such as to be capable of reflecting light substantially the same way as the photosensitive surface of the film FI.

As shown in FIG. 2, the photoreceptor device 13 consists of a divisional photometer element 13a corresponding to a circular photometric area in the central section of the field, and divisional photometer elements 13b to 13e corresponding to four peripheral photometric areas each having a rectangular configuration with an arc-shaped cutout; these divisional photometer (photoreceptor) elements 13a to 13e are arranged in the same plane and adapted to perform divisional photometry on the five divisional photometric areas constituting the field. The condenser lens array 12 is an optical component having three lens sections 12a to 12c respectively corresponding to three blocks, into which the divisional photoreceptor elements 13a to 13e are grouped, i.e., the left, middle and right blocks shown in FIG. 2.

The positional relationship between the exposure area 20 of the surface of the film FI, the photoreceptor device 13, and the condenser lens array 12 is as shown in FIG. 2. Assuming that the exposure area 20 of one frame of the film FI is divided, like the field, into five areas consisting of a circular central area 20a and four divisional peripheral areas 20b to 20e, the three blocks of the divisional photoreceptor elements 13a to 13e, shown in FIG. 2, are respectively connected to the left, middle and right sections of the film exposure area 20 through the three lens section 12a to 12c, respectively. Further the five divisional photoreceptor elements constituting the photoreceptor device 13 have configurations respectively corresponding to those of the five divisional sections of the exposure area 20 of the film FI, so that photometry can be performed with respect to the brightness of each of the five divisional exposure areas 20a to 20e.

Next, the control system of this embodiment will be described with reference to FIG. 3. The system shown includes a control circuit (inclusive of a CPU) 31, which is a circuit for performing sequence control over the entire camera and which is connected to a release button 32, a lens information output circuit 33, a stationary-light photometry circuit 34, an ISO sensitivity detection circuit 35, a flashing control circuit 36, a photographing condition setting means 37, a light adjustment circuit 40, etc.

The lens information output circuit 33 is a circuit which includes a lens ROM for storing information peculiar to the lens (full-aperture value, exit pupil value, focal length, etc.) and a lens encoder for detecting the object distance as measured from the focusing position of the photographic lens 2. The stationary-light photometry circuit 34 is a circuit which performs photometry on the basis of the output from the photometer device 8 for stationary light. The light adjustment circuit 40 is a circuit which performs light adjustment on the basis of the output from the divisional photoreceptor elements 13a to 13e. The ISO sensitivity detection circuit 35 is a circuit which reads the ISO sensitivity of the film with which the camera is loaded, from a DX code. The flashing control circuit 36 is a circuit which is provided inside the electronic flashing circuit 11 and adapted to control the flashing in accordance with a signal generated by the control circuit 31 on the basis of the output from the light adjustment circuit 40.

The photographing condition setting means 37 is a means for automatically setting the most suitable control mode on each occasion through the input, for example, of the kind of photographic scene, such as portrait, close-up, sports, outdoors, or party, and other items of data peculiar to the camera. The input of these items of data may be effected by a dial system, an IC card system (Japanese Patent Laid-Open No. 1-287538), etc.

Next, the light adjustment circuit 40 will be described with reference to FIG. 4. The light adjustment circuit 40 is a circuit which performs light adjustment on the basis of the output from the photoreceptor device 13; the circuit is composed of: amplifiers 41a to 41e for amplifying the respective outputs of the divisional photoreceptor elements 13a to 13e; gain setters 42a to 42e for setting the respective amplification factors of the amplifiers 41a to 41e through built-in D/A converters in response to control signals supplied from the control circuit 31; integration circuits 43a to 43e for integrating the respective outputs of the amplifiers 41a to 41e with respect to time; an adder circuit 44 for adding together the outputs of the amplifiers 41a to 41e in order to detect the total flash amount at the time of main flashing; an integration circuit 45 for integrating the addition results from the adder circuit 44 with respect to time; a D/A converter 46 for converting a light adjustment level (which is described below) calculated by the control circuit 31 into an analog signal; and a comparator 47, which emits a flashing stop signal when the output from the integration circuit 45 reaches the light adjustment level that has been converted into an analog signal by the D/A converter 46.

Next, the control procedures by the CPU 31 will be described with reference to the flowcharts of FIGS. 5 to 9.

Figure 5:
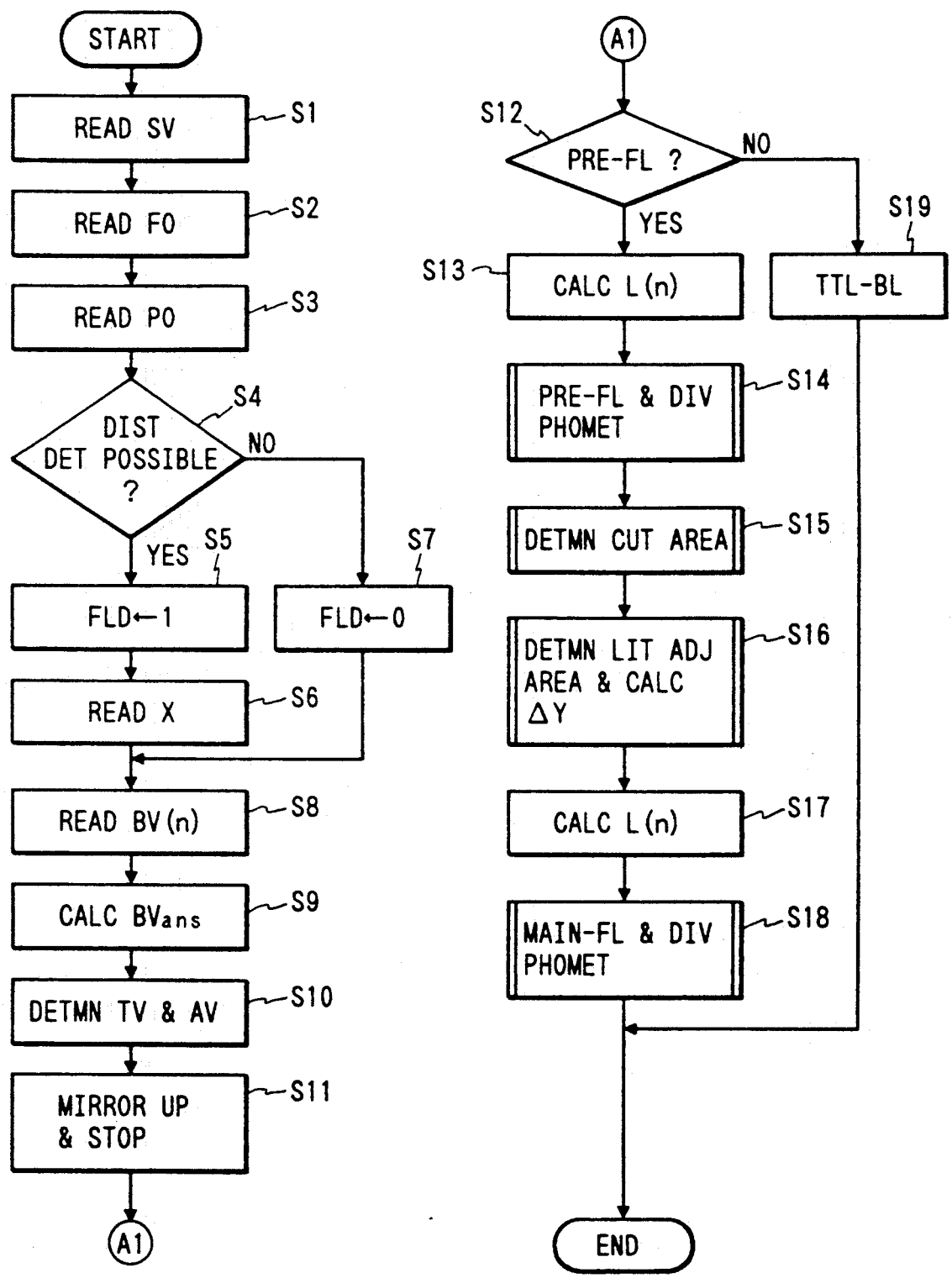

FIG. 5 shows a flowchart of a main control program, according to which the procedures from step S1 onward are started upon a half-push, and then, a full-push (release) operation, of the release button 32 (FIG. 3). First, in step S1, the ISO sensitivity of the film with which the camera is loaded is read from the ISO sensitivity detection circuit 35. Then, the full-aperture metering value FO and the exit pupil value PO are read from the lens information output circuit 33 for the photographic lens 2, in steps S2 and S3, respectively.

In step S4, a judgment is made as to whether distance detection can be performed or not. It can be performed, for example, when the photographic lens 2 is equipped with a built-in distance encoder. When distance detection is possible, "1" is substituted for a flag FLD in step S5. If the photographic lens 2 is equipped with no built-in distance encoder, distance detection cannot be performed; in that case, "0" is substituted for the flag FLD in step S7. In the case of step S5, the object distance X, mentioned above, is read in step S6 and then the procedure moves on to step S8. In the case of step S7, the procedure directly moves on to step S8. The object distance X is a value which indicates the position of the lens when it is moved by the automatic focusing device, for example, through half-pushing of the release button 32, the value being detected by the encoder.

In step S8, photometry is performed under a stationary-light condition. That is, the outputs of the above-mentioned five divisional photometer elements 8a to 8e (FIG. 3), are supplied to the photometric circuit 34, where they undergo logarithmic compression, and are read as luminance values BV (n) (n=1∼5) which respectively correspond to the five photometric areas. Here, it is assumed that the values of n in this embodiment, ranging from 1 to 5, respectively correspond to the five photometer elements 8a to 8e or the five divisional photoreceptor elements 13a to 13e. Next, in step S9, a stationary light exposure BVans is calculated from the luminance values BV (n) and the ISO sensitivity SV that have been read. The method of this calculation is well known in the art, so a detailed explanation thereof will be omitted here.

Afterwards, the procedure moves on to step S10, where the shutter speed TV and the aperture value AV are determined from the calculated value of stationary light exposure BVans, and, in step S11, the mirror 3 is raised from the position indicated by the broken line to that indicated by the solid line, of FIG. 2, and, at the same time, the stop 9 is narrowed down to the aperture value AV determined in step S10; then, the procedure moves on to step S12.

In step S12, a judgment is made as to whether preliminary flashing is to be effected or not. It is little use effecting preliminary flash if the stationary light is sufficiently bright or the aperture value AV determined in step S10 is one at a brightness level below a fixed value, so that the procedure moves on to step S19 without effecting any preliminary flashing. Otherwise, the procedure moves on to step S13. In step S19, a TTL-BL light adjustment processing is performed, thereby ending the operation. This TTL-BL light adjustment processing is well known in the art, so a detailed description thereof will be omitted here.

In step S13, the lens correction coefficient L(n) at the time of the photometry performed on the reflection from the shutter reflection surface is calculated.

$$L(1) = 1$$

$$L(2) = 1 - (1.2 \times 10^{-3}) \cdot PO$$

$$L(3) = 1 - (1.2 \times 10^{-3}) \cdot PO$$

$$L(4) = 1 + (1.7 \times 10^{-3}) \cdot PO$$

$$L(5) = 1 + (1.7 \times 10^{-3}) \cdot PO$$

Here, PO represents the exit pupil distance of the photographic lens 2. That is, the light acceptance conditions for the above photoreceptor elements 13a to 13e vary depending on the exit pupil distance PO of the photographic lens 2. Thus, the reason for obtaining the lens correction coefficients L(n) in step S13 is to enable the photometry signals of all the photoreceptor elements to be evaluated under the same condition.

In step S14, preliminary flashing is effected, and divisional photometry is performed on the reflected light from the reflection screen surface. In step S15, cut areas (areas which are to be excluded with respect to light adjustment) are determined on the basis of the results of this photometry. In step S16, light adjustment areas are determined and, at the same time, a light-adjustment correction amount ΔY is determined. The operations in these steps, S14 to S16, will be described in detail below.

In step S17, the lens correction coefficients at the time of photometry on the reflection from the film surface, L(n), are calculated, and further, in step S18, the shutter 10 is fully opened to effect main flashing, and, at the same time, divisional photometry is performed in the reflected light from the film surface to effect light adjustment. These operations will also be described in detail below.

Figure 6:
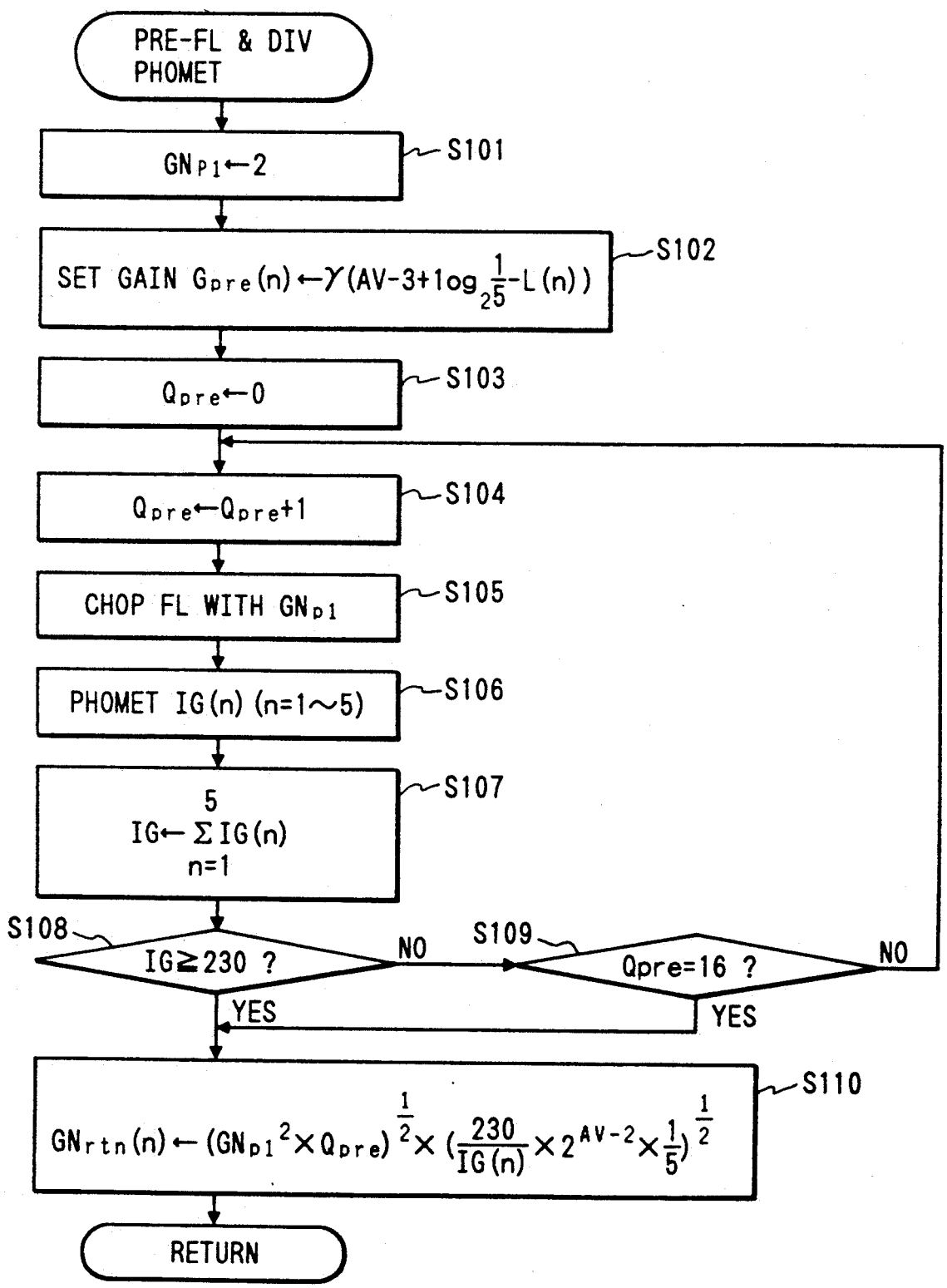

FIG. 6 is a flowchart showing in detail the operation in step S14 of FIG. 5, i.e., the preliminary flashing operation.

In step S101 of FIG. 6, the guide number per preliminary flash, $GN_{p1}$, is set to 2. That is, in this embodiment, a chopped flashing is effected a plurality of times as the preliminary flashing. In step S102, gains Gpre(n) to be imparted to the gain setters 42a to 42e of the light adjustment circuit 40 (FIG. 4) are obtained from the following equation by using the lens correction coefficients L(n) obtained in step S13:

$$Gpre(n) = \gamma \left( AV - 3 + \log 2 \frac{1}{5} - L(n) \right)$$

In step S103, the frequency of the chopped flashing, QPre, is reset to 0. Then, in step S104, the QPre is incremented by "1", and the procedure moves on to step S105, where one chopped flashing is effected with the above guide number $GN_{p1}$ (=2), and, in step S106, photometry is performed on the reflection due to this flashing. Thus, the light of the chopped flashing is reflected by the subject and transmitted through the photographic lens 2 to form a primary image on the reflection surface of the shutter 10. This primary image is divided into five sections, which are respectively received by the five divisional photoreceptor elements 13a to 13e through the condenser lens array 12. The divisional photoreceptor elements 13a to 13e transmit photometry signals, respectively corresponding to the quantities of light they have received, sequentially to the amplifiers 41a to 41e of the above light adjustment circuit 40.

The amplifiers 41a to 41e amplify the input signals in accordance with the gains $G_{pre}(n)$ of the gain setters 42a to 42e (those obtained in step S102) and supply them to the integration circuits 43a to 43e. The CPU 31 supplies operation signals to the integration circuits 43a to 43e, which, in response to these operation signals, integrate the above amplified signals with respect to time, supplying them to the CPU 31 as IG (n) (n=1∼5).

Next, in step S107, the sum total of the above five photometry signals IG (n) is obtained, and is added to the previous IG (which is initially 0) to obtain a new IG. The procedure then moves on to step S108. If, in step S108, the above IG is judged to be less than a fixed value (which is 230 in this case), the procedure moves on to step S109, and, if, in this step, the frequency of the chopped flashing, QPre, is judged to be less than 16, the procedure returns to step S104 and the above operations are executed again. If the IG reaches 230 in step S108, or, if Qpre reaches 16 in step S109, the procedure moves on to step S110, where GNrtn (n) is obtained from the following equation:

$$GNrtn(n) = (GNpf^2 \times Qpre)^{\frac{1}{2}} \times \left( \frac{230}{IG(n)} \times 2^{AV-2} \times \frac{1}{5} \right)^{\frac{1}{2}}$$

According to the above equation, GNrtn (n) is a value obtained by multiplying the aperture value F by the object distance X when the subject of each area exhibits a standard reflectance. In other words, it may be assumed that in an area where $F \cdot X = Grtn$ (n), a subject having the standard reflectance is at a position corresponding to the object distance of X; that in an area where $F \cdot X > Grtn$ (n), an object having a reflectance higher than the standard reflectance is at a position corresponding to X; and that in an area where $F \cdot X < Grtn$ (n), an object having a reflectance lower than the standard reflectance is at a position corresponding to X. That is, the higher the reflectance of the object, smaller the GNrtn (n).

Figure 7:
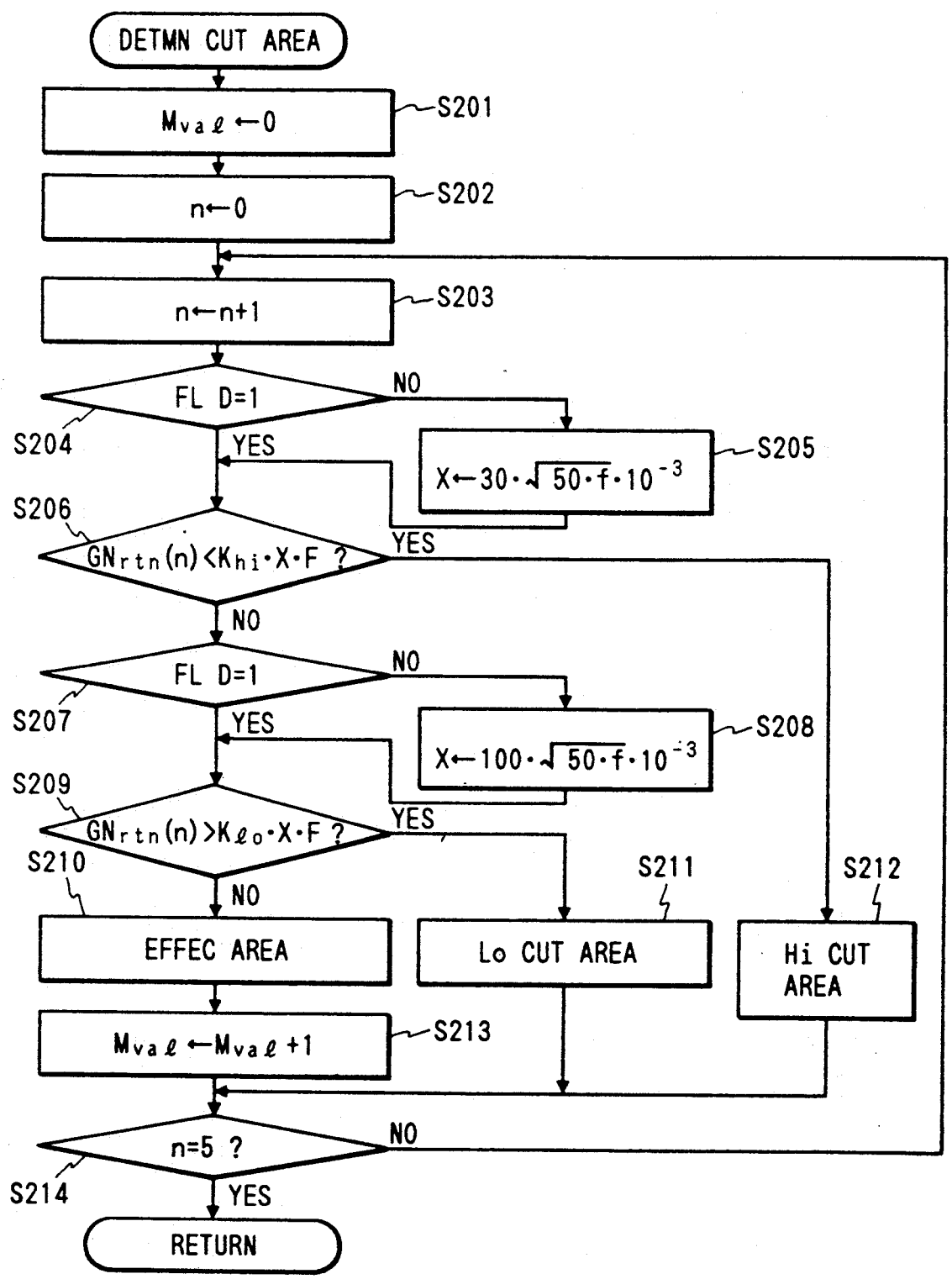

FIG. 7 shows in detail the operation of determining Hi and LO cut areas, which is executed in step S15 (FIG. 5).

First, in step S201, the number of effective areas, Mval, is reset to 0, and, in step S202, n is reset to 0. In step S203, n is incremented by "1", and then, in step S204, a judgment is made as to whether the flag FLD is 1 or not. If the flag FLD is not 1, it implies that no object distance X has been detected. If the result of step S204 is affirmative, i.e., if the object distance X has been detected, the procedure moves on to step S206; if the result of step S204 is negative, the near end distance of the normal object distance when the electronic flashing device 11 is used is obtained in step S205 from the following equation:

$$X = 30 \cdot \sqrt{50 \cdot f} \cdot 10^{-3}$$

When this has been obtained as X, the procedure moves on to step S206. If, for example, f=24 mm, X=1.0 m; if f=50 mm, X=1.5 m; and if f=105 mm, X=2.2 m.

In step S206, a judgment is made as to whether or not the GNrtn (n) calculated in step S110 (FIG. 6) satisfied the following:

$$GNrtn(n) < Khi \cdot X \cdot F$$

When the result of this judgment is negative, the procedure moves on to step S207; if it is affirmative, an object of high reflectance, such as a gold-leafed folding screen or a mirror, exists in the area concerned. Or, alternatively, it is determined that a subject (which is not the principal subject) is on the nearer side with respect to the position corresponding to the object distance X, and the procedure moves on to step S212; the area is regarded as a Hi cut area and the procedure moves on to step S214.

In step S207, a judgment is made again as to whether the flag FLD is 1 or not. If the result of the judgment is affirmative, the procedure moves on to step S209; if the result is negative, the farthest end distance of the normal object distance X when the electronic flashing device is used is obtained in step S208 from the following equation:

$$X = 100 \cdot \sqrt{50 \cdot f} \cdot 10^{-3}$$

When this has been obtained as X, the procedure moves on to step S209. If, for example, f=24 mm, X=3.5 m; if f=50 mm, X=5.0 m; and if f=105 mm, X=7.2 m.

In step S209, a judgment is made as to whether or not the above GNrtn (n) satisfies the following:

$$GNrtn(n) > Klo \cdot X \cdot F$$

When the result of this judgment is negative, the procedure moves on to step S210; if it is affirmative, it is determined that an object of low reflectance exists in the area concerned (which is the case, for example, when the background is missing), and the procedure moves on to step S212. The area is regarded as a Lo cut area and the procedure moves on to step S214. Here, the Hi and Lo cut areas correspond to the areas to be excluded with respect to light adjustment.

Further, if the results of steps S206 and S209 are both negative, the area concerned is regarded as an effective area, i.e., an area on which light adjustment is to be performed; and the number of effective areas, Mval, is incremented by "1" in step S213, the procedure moving on to step S214.

In step S214, a judgment is made as to whether n=5 or not, i.e., whether the above processing has been executed with respect to all the areas or not. If the result of the judgment is negative, the procedure returns to step S203; and if it is affirmative, the procedure returns to the operation of FIG. 5.

According to the above processing of FIG. 7, the cut and effective areas are determined from the values of GNrtn (n), calculated on the basis of the photometry signals of the areas at the time of preliminary flashing. Thus, when $GNrtn(n) < Khi \cdot X \cdot F$, the area is judged to be a Hi cut area; when $GNrtn(n) > Klo \cdot X \cdot F$, the area is judged to be a Lo cut area; and when $Klo \cdot X \cdot F > GNrtn(n) > Khi \cdot X \cdot F$, the area concerned is judged to be an effective area. That is, those areas where the photometric signals at the time of preliminary flashing is within a fixed range are determined to ones on which light adjustment is to be performed, and those areas where the signals are out of that range are determined as ones which are to be excluded with respect to light adjustment.

Figure 8A:
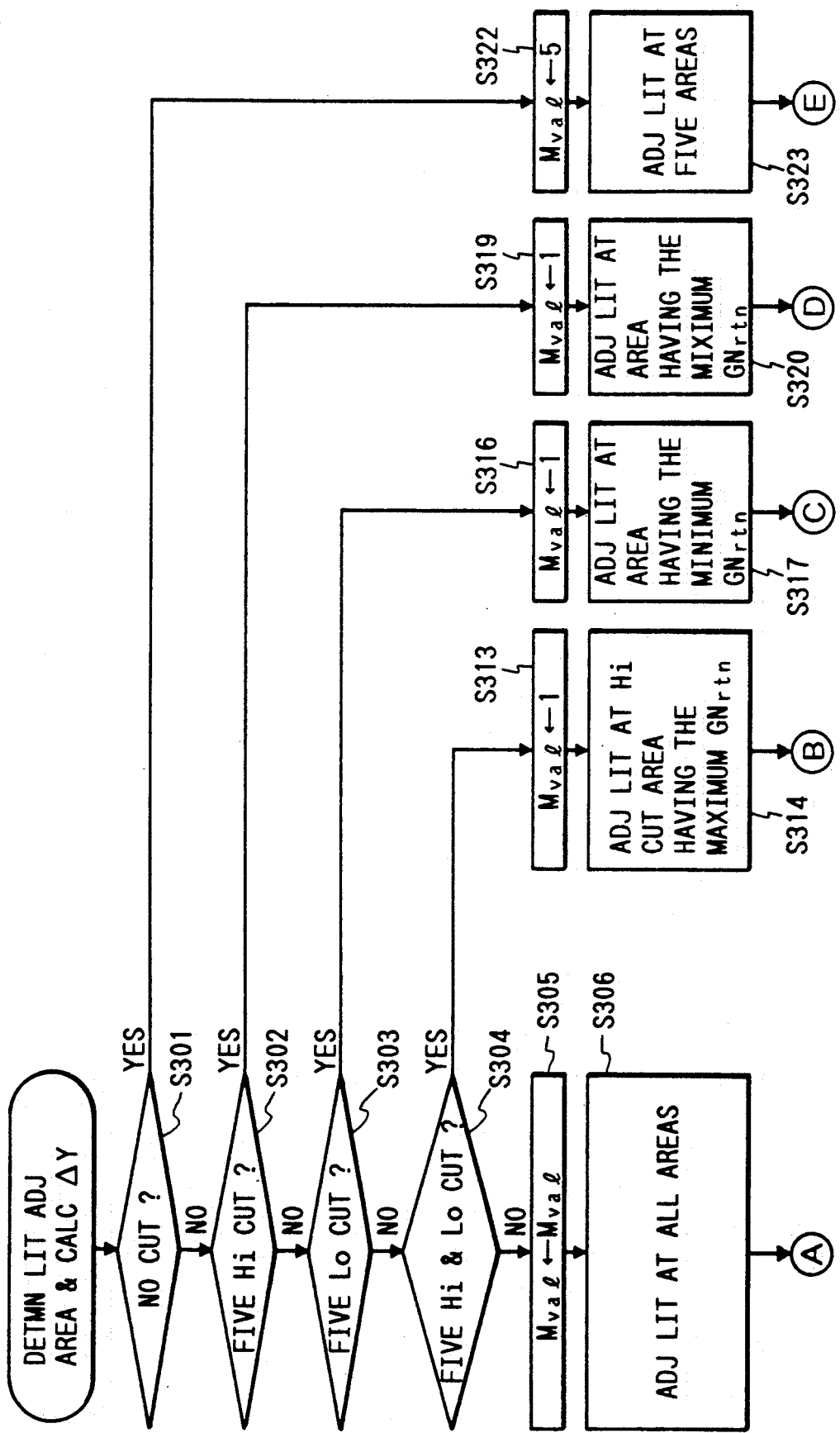
Figure 8B:
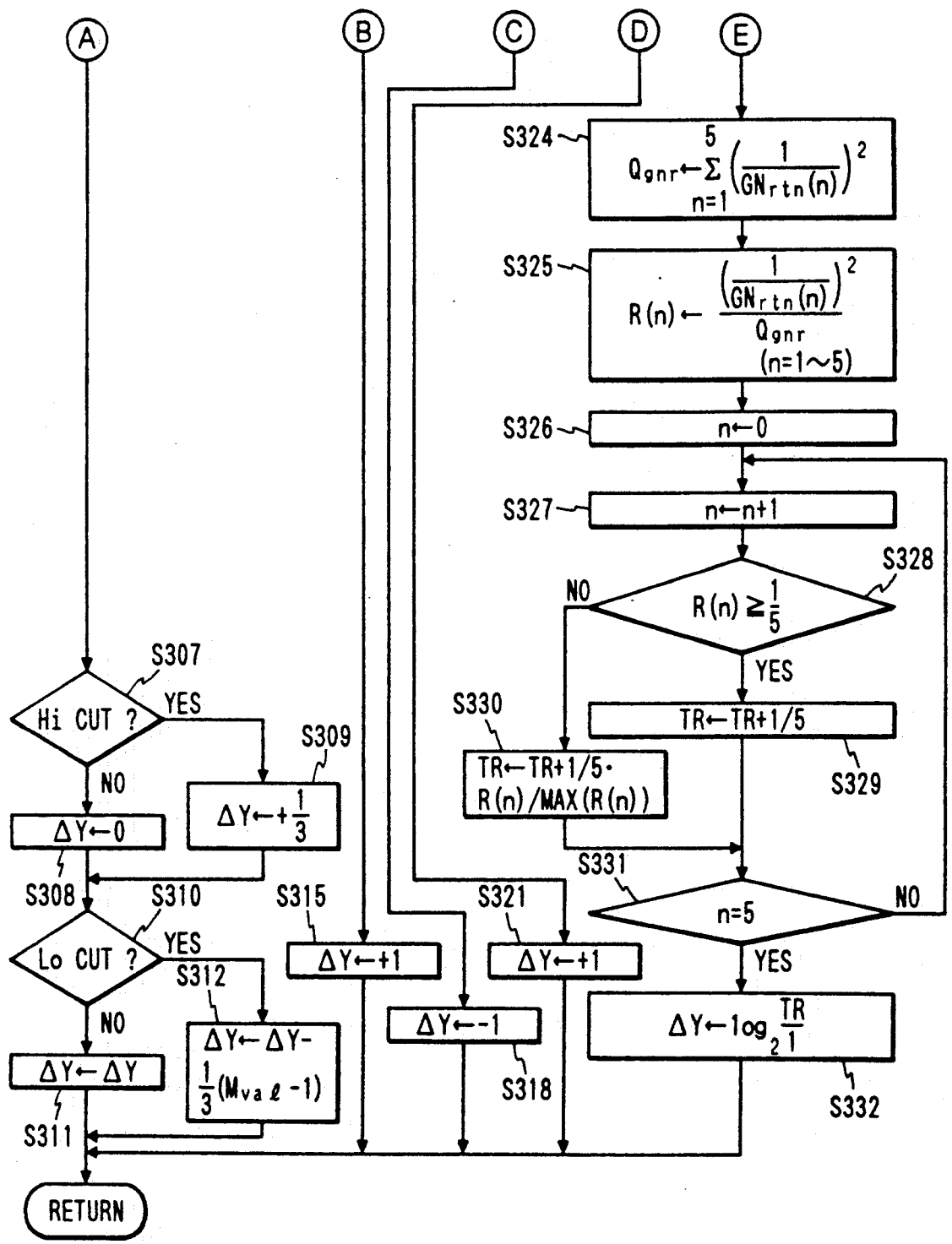

FIGS. 8A and 8B show in detail the operation of step S16 (FIG. 6).

This operation is performed with a view to determining the final light adjustment areas and obtaining a light-adjustment correction amount ΔY. The light adjustment-correction amount ΔY is a value which is used, as shown in step S404 of FIG. 9 described below, when obtaining the gains to be imparted to the gain setters 42a to 42e of the light adjustment circuit 40 at the time of main flashing. In the case where ΔY>0, the larger the value, the later the time at which the main flashing stops and the larger the flash amount; in the case where $\Delta Y < 0$, the larger the $|\Delta Y|$, the earlier the time at which the main flashing stops and the smaller the flash amount.

In FIG. 8A, the operations of steps S301 to S304 are performed for the purpose of determining to which of the following five conditions the result of the above processing of FIG. 7 belongs: (1) There are no cut areas; (2) all the five areas are Hi cut areas; (3) all the five areas are Lo cut areas; (4) all the five areas are cut areas including both Hi and Lo cut areas; and (5) both cut and non-cut areas exist. In accordance with the result of the determination, the following operations are performed:

(1) When there are no cut areas (i.e., when all the areas are light adjustment areas):

In this case, the result of step S301 is affirmative, and the procedure moves on to step S322. The number of effective areas, Mval, is set to 5, and all the five areas are set as the areas on which light adjustment is to be performed, the procedure moving on to step S324, where Qgnr (which is a value depending on the sum total of the photometry signals of the five areas at the time of preliminary flashing) is calculated from the equation:

$$Qgnr = \sum_{n=1}^{5} \left( \frac{1}{GNrtn(n)} \right)^2$$

Then, in step S325, the photometry signal distribution R(n) of the five areas when the sum total of the respective photometry signals of these areas is 1, is obtained from the equation:

$$R(n) = \frac{\left( \frac{1}{GNrtn(n)} \right)^2}{Qgnr}$$

where $n = 1 \sim 5$.

In step S326, n is set to, and, in steps S327 to S331, the operation of obtaining TR is performed on the basis of the distribution R(n) with respect to the five areas ($n = 1 \sim 5$). If R(n) is 1/5 or more, 1/5 is added to the previous TR to obtain a new TR; if R(n) is less than 1/5, $$\frac{1}{5} \cdot \frac{R(n)}{MAX(R(n))}$$

is added to the previous TR to obtain a new TR. Here, MAX (R(n)) is the maximum value of R(n). In step S332, the above TR, finally obtained, is used to obtain the value of the light-adjustment correction amount $\Delta Y$ from the equation:

$$\Delta Y = \log 2 \frac{TR}{1}$$

Thus, the light-adjustment correction amount $\Delta Y$ can be obtained on the basis of the photometry signal distribution of with respect to the areas, so that, in the main flashing process of FIG. 9, the time at which the main flashing stops can be controlled accurately.

(2) When all the areas are Hi cut areas (i.e., when the photometry signals of all the areas at the time of preliminary flashing are above a fixed range):

In this case, the result of step S302 in FIG. 8A is affirmative and the procedure moves on to step S319, where Mval is set to 1, and, in step S320, the area exhibiting the maximum GNrtn(n) is newly selected as an area on which light adjustment is to be performed. The maximum GNrtn(n) implies the minimum photometry signal at the time of preliminary flashing, that is, the closest proximity to the above fixed range serving as the criterion for the judgment as to whether an area is a cut area or not. The area thus selected is the one which is expected to be least affected by the object of high reflectance. However, if there are a plurality of such areas, the one in the central section has priority over the remaining ones. Subsequently, the procedure moves on to step S321, where the light-adjustment correction amount $\Delta Y$ is incremented by "1". Thus, when all the areas are Hi cut areas, the time at which light adjustment is stopped is made later than usual in order to avoid inadequate exposure.

(3) When all the areas are Lo cut areas (i.e., when the photometry signals of all the areas at the time of preliminary flashing are below the fixed range):

In this case, the result of step S303 in FIG. 8A is affirmative and the procedure moves on to step S316, where Mval is set to 1, and, in step S317, the area exhibiting the minimum GNrtn(n) is newly selected as an area on which light adjustment is to be performed. The minimum GNrtn(n) implies the maximum photometry signal at the time of preliminary flashing, that is, the closest proximity to the above fixed range serving as the criterion for the above judgment as to whether an area is a cut area or not. The area thus selected is the one which is expected to be least affected by the reflected light due to the flashing not returning. If, however, there exist a plurality of such areas, the one in the central section has priority over the remaining ones. Subsequently, the procedure moves on to step S318, where the light-adjustment correction amount $\Delta Y$ is decremented by "1". Thus, when all the areas are Lo cut areas, the time at which light adjustment is stopped is made earlier than usual in order to avoid over-exposure.

(4) When all the areas are cut areas inclusive of both Hi and Lo cut areas:

In this case, the result of step S304 is affirmative and the procedure moves on to step S313, where Mval is set 1, and, in step S314, the area exhibiting the maximum GNrtn(n) is newly selected as an area on which light adjustment is to be performed, as in the case of (2). Further, in step S315, the light-adjustment correction amount $\Delta Y$ is incremented by 1. If, however, there exist a plurality of such areas, the one in the central section has priority over the remaining ones. No object output to exist is a Lo cut area, where the background is missing, whereas, in a Hi cut area, an object of high reflectance (e.g., a gold-leafed folding screen or a mirror) ought to exist; accordingly, it is to be assumed that the principal subject must lie buried in this Hi cut area. Thus, in order to eliminate the influence of such a high reflectance object, $\Delta Y$ is incremented by one as in the case of (2).

(5) When both cut and effective areas exist:

In this case, the result of the judgment in step S304 is negative, and the procedure moves on to step S305, where Mval is set to a value not obtained in step S213 (FIG. 7), and those areas which have not been cut are regarded as ones on which light adjustment is to be performed. Next, the procedure moves on to step S307 of FIG. 8B, where a judgment is made as to whether there exist a Hi cut area or not. If there is any Hi cut area, the light-adjustment correction amount ΔY is incremented by ⅓ in step S309. If there is no Hi cut area, ΔY is reduced to 0 in step S308, and the procedure moves on to step S310, where a judgment is made as to whether there exist any Lo cut area or not. If there is a Lo cut area, ΔY is set, in step S312, in accordance with the following equation:

$$\Delta Y = \Delta Y - \frac{1}{3} (Mval - 1)$$

when there is no Lo cut area, the ΔY at the time is again adopted as ΔY.

Thus, as stated above, the fact that there exists any Hi cut area implies that an object of high reflectance exists there, and, the adjacent are in many cases likely to be under the influence of that object even if they are not Hi cut areas, so that ΔY is incremented by ⅓.

The case where a Lo cut area exists will be described below:

Suppose there exists nothing behind the principal subject. In that case, the number of effective areas differs depending upon whether the subject is in an edge section of the picture frame or in the central section of the same, even under the same magnification. When it is in an edge section of the frame, the area containing the subject is relatively small, so that the effective areas (the areas which is not Lo-cut) are reduced. When the subject is in the central section of the frame, the area containing the subject is relatively large, so that the number of effective areas is relatively large. And, assuming that the magnification of the subject is the same, the larger the number of effective areas, i.e., areas containing the subject, the smaller the area of the subject portion occupying each area, and the lower the photometry signal level therein (GNrtn (n) is larger). Thus, in this embodiment, the larger the number of effective areas, Mval, the larger becomes the ΔY on the minus side, as indicated by the equation of step S312.

FIG. 9 shows in detail the process of main flashing in step S18 of FIG. 5.

In step S401 of FIG. 9, n is reset to 0, and then, in step S402, n is incremented by "1". In step S403, a judgment is made as to whether the area indicated by n is an area on which light adjustment is to be performed or not. If the result of step S403 is negative, the procedure moves on to step S405, where the gain Ghon (n) to be imparted to the corresponding gain setter of the light adjustment circuit 40 is set to a sufficiently small value (e.g., −10), the procedure moving on to step S406. If the result of step S403 is affirmative, the gain Ghon (n) is calculated in step S404, by using the ΔY obtained in the procedures of FIG. 8B, from the following equation:

$$Ghon(n) = \gamma \left( SV + \log 2 \frac{1}{Mval} - L(n) - \Delta Y \right)$$

Then, the procedure moves on to step S404. In the above equation, SV is the ISO sensitivity of the film; L(n) is the lens correction coefficient obtained in step S17; ΔY is the light-adjustment correction amount obtained in the process of FIG. 9B; and γ is a constant. In step S404, a judgment is made as to whether n=5 or not. If the result of the judgment is negative, the procedure returns to step S402; if it is affirmative, the procedure moves on to step S407.

By the above operations, the gains Ghon(1) to Ghon(5) are respectively imparted to the gain setters 42a to 42e.

Next, in step S407, the electronic flash device 11 starts main flashing, and, in step S408, photometry is performed. That is, the illuminating light due to the main flashing is reflected by the subject and transmitted through the photographic lens 2 to be reflected by the film surface; afterwards, it is received by the five photoreceptor elements 13a to 13e, with the respective photometry signals IG(1) to IG(5) of the photoreceptor elements 13a to 13e being respectively supplied to the amplifiers 41a to 41e of the light adjustment circuit 40.

The amplifiers 41a to 41e amplify the photometry signals IG(1) to IG(5) in accordance with the gains Ghon(1) to Ghon(5) set by the gain setters 42a to 42e and supply them to the adder circuit 44, which performs addition on the amplified signals supplied thereto. The integration circuit 45 integrates the result of the addition in the adder circuit 44, i.e., the sum total of the amplified photometry signals IG(1) to IG(5) with respect to time, and provides the value thus obtained as IG (step S409).

The previously set light adjustment level, on the other hand, is supplied to the converter 46, which converts it to an analog signal. This light adjustment level thus converted and the output of the integration circuit 45, IG, are supplied to the comparator 47, which makes a judgment as to whether the IG has attained the above light adjustment level LV or not (step S410). If the result of this judgment is negative, the procedure returns to step S408; if it is affirmative, the flashing control circuit 36 for the electronic flash device 11 is controlled in step S411 to stop the main flashing; then, the processing is terminated.

In accordance with the process described above, the gain Ghon (n) is obtained on the basis of the light-adjustment correction amount ΔY; and when ΔY>0, the larger the value, the later becomes the time at which the main flashing is stopped, with the flash amount becoming larger. When ΔY<0, the larger |ΔY|, the earlier becomes the time at which the main flashing is stopped, with the flash amount becoming smaller.

In the construction of the above embodiment, the electronic flash device 11 constitutes a flashing means 101; the divisional photometer elements 13a to 13e constitute a photometer means 102; the CPU 31 constitutes area setting means 103, 201 and 202, and a discrimination means 104; and the CPU 31 and the light adjustment circuit 40 constitute light adjusting means 105 and 203.

In the above-described embodiment, the light-adjustment correction amount ΔY is determined in accordance with whether the area concerned is a Hi cut area or a Lo cut area, and based on this ΔY, the gains for the gain setters are obtained, the main flashing being stopped when the sum total of the photometry signals at the time of main flashing, corrected in accordance with these gains, has attained a fixed light adjustment level (which is previously set). The same effect, however, can also be obtained, for example, by determining a light adjustment level on the basis of the above ΔY and stopping the main flashing when the sum total of the photometry signals at the time of main flashing (not corrected) has attained the above-mentioned light adjustment level determined.

Further, the method of obtaining light-adjustment areas and non-light-adjustment areas from the photometry signals at the time of preliminary flashing and the value of the light-adjustment correction amount ΔY, are not restricted to those described above. Further, the manner in which the field is divided and the number of divisional areas are not restricted to those of the above embodiment, either.

Thus, according to this invention, the condition for light adjustment for stopping the main flashing when there is any non-light-adjustment area is determined in accordance with whether the photometry signal level of that area at the time of preliminary flashing is within a fixed range or not, whereby it is more likely for correct exposure to be obtained, as compared to the case where such an area is simply excluded.

Further, in accordance with this invention, light adjustment when all the photometric areas are non-light-adjustment areas is performed by regarding that one of those areas which is closest to a fixed range (one judged to be the light-adjustment range) as a light-adjustment range, so that it is likely for correct exposure to be obtained even when all the photometric areas are judged to be non-light-adjustment areas.

Figure 10:
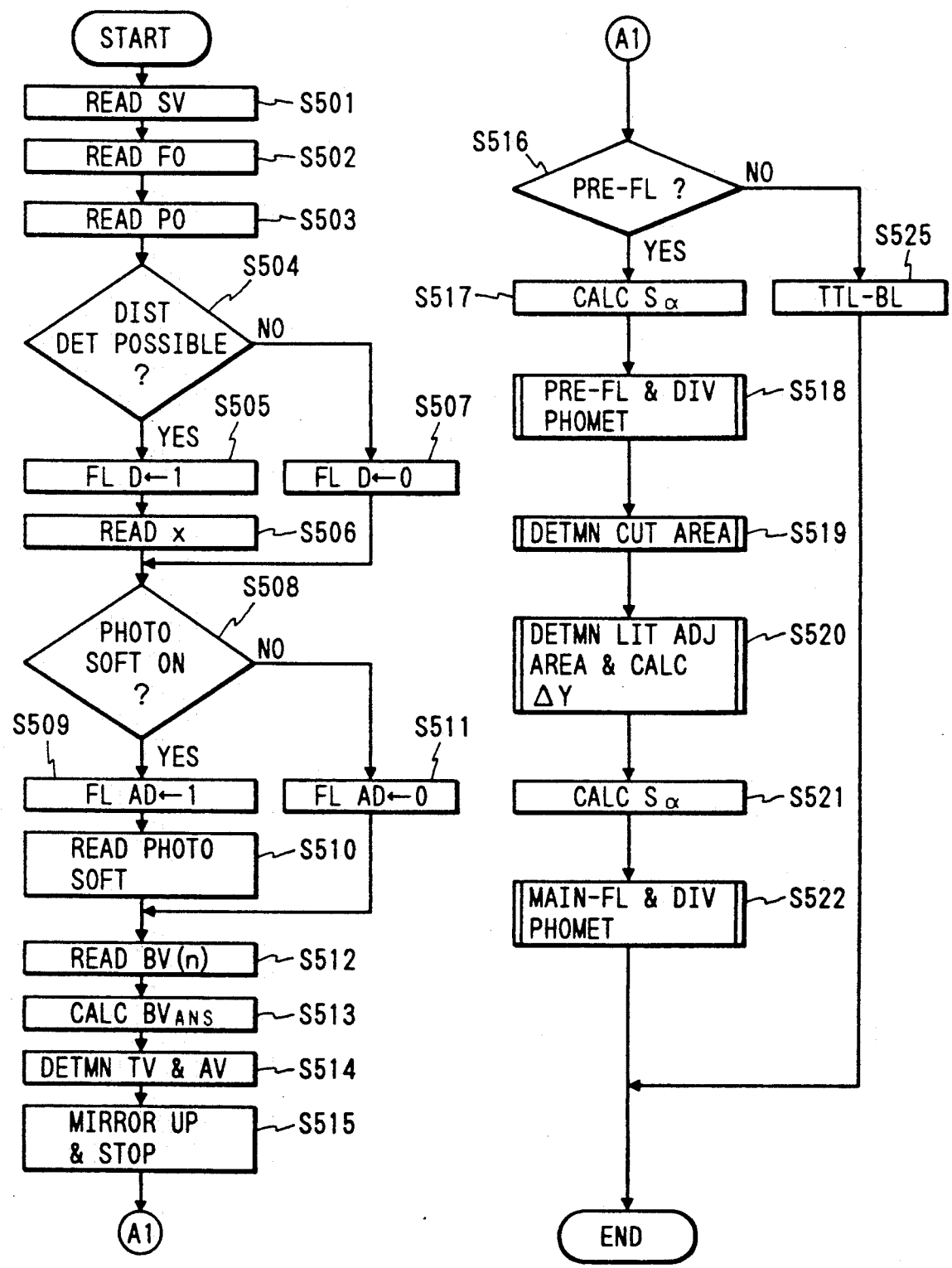
FIG. 10 is a flowchart showing the main operation of an automatic light adjustment device for cameras in accordance with another embodiment of this invention.

Next, the operation of an automatic light adjustment device for cameras in accordance with another embodiment of this invention will be described with reference to FIGS. 10 to 14. FIG. 10 is a flowchart showing the main operation of this embodiment of the automatic light adjustment device for cameras of this invention. When the release button 32 is depressed to the full, subsequent to a half-push operation of the same, the procedures from step S501 onward are started.

First, in step S501, the ISO sensitivity of the film with which the camera is loaded is read from the ISO sensitivity detection circuit 35. Then, the full-aperture value FO and the exit pupil value PO are read from the lens information output circuit 33 of the photographic lens 2, in steps S502 and S503, respectively.

In step S504, a judgment is made as to whether distance detection can be performed or not. When, for example, the photographic lens 2 is equipped with a built-in distance encoder, distance detection can be performed, so, in step S503, 1 is substituted for the flag FLD. When the photographic lens has no built-in distance encoder, distance detection cannot be performed; in that case, 0 is substituted for the flag FLD in step S507.

In the case where distance detection can be carried out, that is, where the flag FLD is 1, the procedure moves from step S505 to step S506, where the object distance X is read. The object distance X consists, for example, of a value corresponding to the position of the photographic lens 2, which is driven by the automatic focusing device through a half-push operation of the release button 32.

If, in step S508, the photographing condition setting means 37 is ON (a condition in which photographing software can be used), the procedure moves on to step S509, where "1" is substituted for a flag FL AD. Then, the procedure moves on to step S510, where the software of the photographing condition setting means 37 is read; the procedure then moves on to step S512. When, step S508, the photographing condition setting means 37 is OFF, the procedure moves on to step S511, where "0" is substituted for the flag FL AD, the procedure moving on to step S512.

In step S512, stationary-light photometry is carried out. That is, the respective outputs of the five divisional photometer elements 8a to 8e are supplied to the photometric circuit 34, and luminance values BV(n) (n=1~5), respectively corresponding to the photometric areas and logarithmically compressed by the photometric circuit 34, are read. In this embodiment, the values of n, which ranges from 1 to 5, respectively correspond to the five photometer elements 8a to 8e or to the five divisional photoreceptor elements 13a to 13e.

Next, in step S513, a stationary-light exposure value BVANS is calculated from the luminance values BV(n) that have been read. Since the method of this calculation is well-known in the art, a detailed description thereof will be omitted here.

Afterwards, the procedure moves on to step S514, where the shutter speed TV and the aperture value AV are determined from the calculated stationary-light exposure value BVANS and the film sensitivity SV. In step S515, the mirror 3 is raised from the position of the broken line to that of the solid line, of FIG. 1, the stop 9 being narrowed down to a degree corresponding to the aperture value AV determined in step S514.

In step S516, a judgment is made as to whether preliminary flashing is to be effected or not. If the stationary light is too bright or the stop 9 is narrowed down to an excessive degree at the time of photographing, the procedure moves on to step S523, where TTL-BL control is executed. Otherwise, the procedure moves on to step S517, where preliminary flashing is executed.

The above judgment and the TTL-BL control are well-known in the art, so a detailed description thereof will be omitted here.

In step S517, any photometric error in the preliminary-flash detection system, which varies depending on the type of the photographic lens 2, is corrected. The correction amount Sα is calculated in accordance, for example, with the calculation formulas disclosed in Japanese Patent Application No. 2-88899 filed by the present applicant.

In step S518, preliminary flashing is effected, and divisional photometry is performed on the light reflected by the reflection surface of the shutter 10. This will be described in detail below with reference to FIG. 11.

In step S519, the cut areas are determined in accordance with the results of step S518. That is, those photometric areas corresponding to the reflected light from an object of high reflectance which will adversely affect the light adjustment, such as a mirror or a gold-leafed folding screen, or those photometric areas to which no reflected light returns due to a total absence of any subject, etc. are regarded as cut areas and excluded with respect to the light adjustment at the time of main flashing. Details on this operation will be given below with reference to FIG. 12.

In step S520, the determination of the light adjustment areas and the calculation of the light-adjustment correction amount ΔY are performed. Though determination of light adjustment areas has been executed once in step S519, a redetermination of the same is in order; this is due, for example, to the fact that, in the first determination, all the photometric areas may have been selected as cut areas. The light-adjustment correction amount ΔY is a value for correcting the reference light adjustment amount in accordance with the results of the preliminary flashing. Details on these operations will be given below with reference to FIGS. 13 and 8A.

In step S521, any photometric error in the main flash detection system, which varies depending on the type of the photographic lens 2, is corrected along with any error in exposure. As in step S517, the correction amount Sβ is calculated, for example, by the calculation formulas disclosed in Japanese Patent Application No. 2-88899.

In step S522, the shutter 10 is fully opened to effect main flashing. Then, divisional photometry is performed on the light reflected from the surface of the film FI to carry out light adjustment. This will be described in detail below with reference to FIG. 8B. After the light adjustment, the shutter 10 is closed, with which the series of sequence control operations are terminated.

Figure 11:
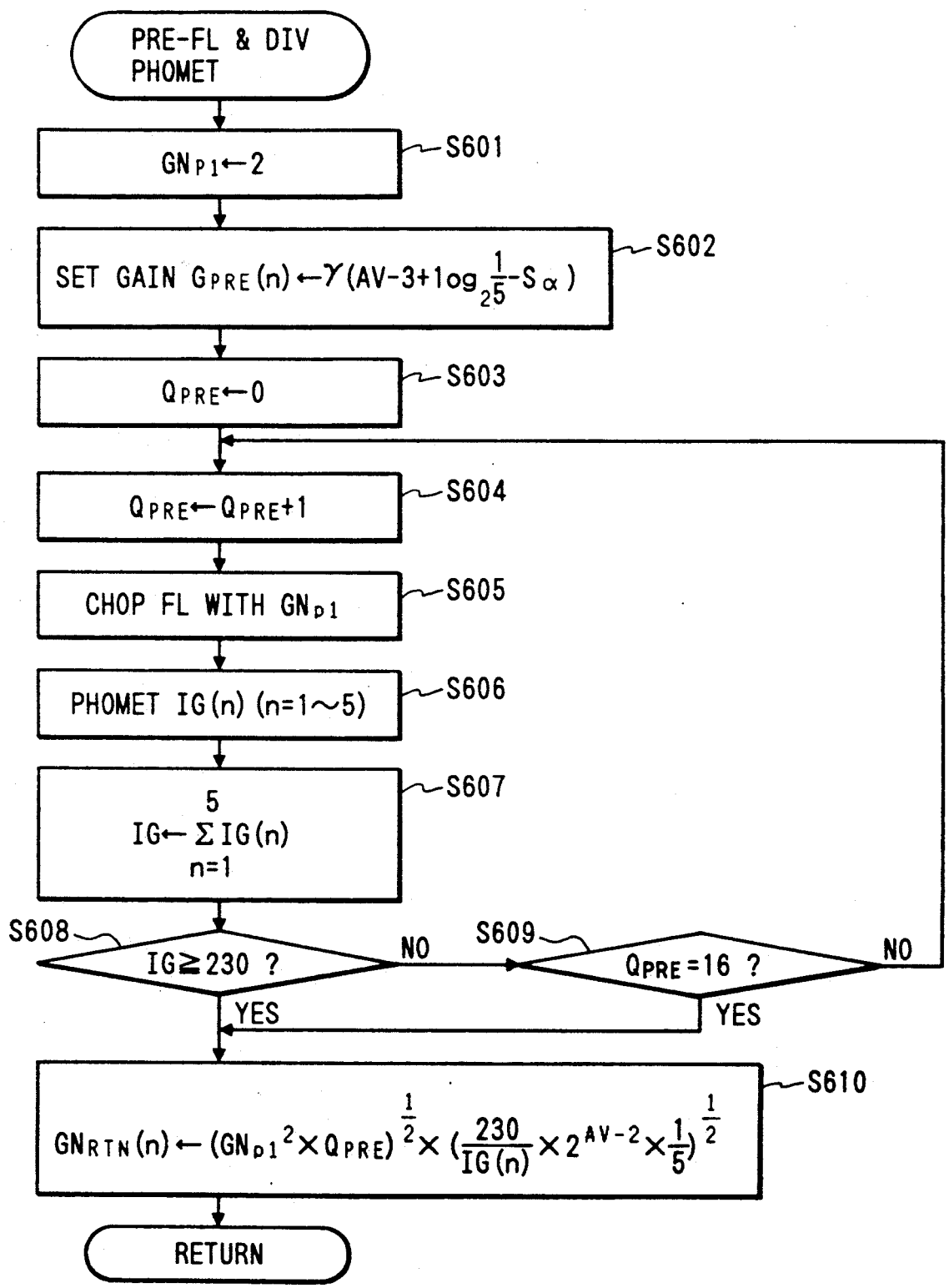
FIG. 11 is a flowchart showing a sub-routine for a preliminary flashing process (step S518 of FIG. 10)

FIG. 11 is a flowchart showing a calculation sub-routine for preliminary flashing (step S518 of FIG. 10). In this sub-routine, a chopped flashing in small light quantities is repeated and continued until light adjustment is completed. From the frequency of the chopped flashing in the stage where light adjustment is completed, the total flash amount of the preliminary flashing is calculated; the result of the calculation is combined with the photometry results of the photometric areas and stored in a memory in the control circuit 31 as guide numbers GNRTN (n).

In step S601, the guide number GNPI per chopped flashing in the flash means 11 is set to a fixed value (which is 2 in this case). In step S602, the gains GPRE(n) at the time of preliminary flashing, which are to be supplied to the gain setters 42a to 42e shown in FIG. 4, are set by the following equation:

GPRE(n)=γ(AV−3+log2(1/5)−Sa)

where γ is the variation in gain per one step of the electronic flash.

In the routine of steps S603 to S609, a predetermined light adjustment level (which is 230 in this case) is compared with the sum total of the photometry values IG(n) [n=1~5] of the photometric areas, IG; in this routine, flashing, photometry and addition are repeated until the IG exceeds the light adjustment level.

First, in step S603, the initial value of the frequency of chopped flashing, QPRE , is set to 0. Then, in step S604, 1 is added to the frequency of chopped flashing, QPRE , each time the routine is executed.

In step S605, the flash means 11 is caused to flash in accordance with the guide number GNPl set in step S601. Next, in step S606, the photometry values IG(n) (n=1~5) from the five divisional photometer elements 13a to 13e are inputted, and, in step S607, the sum total of the photometry values, IG, is obtained from the photometry values IG(1) to IG(5).

In step S608, the sum total of the photometry values, IG, is compared with the set predetermined light adjustment level (=230). If IG is below the light adjustment level, the procedure moves on to step S609; if it is equal to or above the light adjustment level, the procedure moves on to step S610.

If, in step S609, the frequency of chopped flashing, QPRE, is less than 16, the procedure returns to step S604, and the operations up to step S608 are executed again; when the frequency has exceeded 16, the light adjustment operation is stopped, and the procedure moves on to step S610.

Next, in step S610, the setting of the guide numbers GNRTN(n) is performed by the following GNRTN(n)=(GNPl²·QPRE)¹·[(230/IG(n))·2^(AV−2)·(1/5)]¹

When the subject of a photometric area has a standard reflectance, the guide number GNRTN(n) for the area corresponds to a value obtained by multiplying the aperture value (the F value) by the object distance X. That is, F·X and GNRTN(n) is compared with each other for each area. In an area where F·X=GNRTN(n), it is to be assumed that an object of standard reflectance exists at a position corresponding to X; in an area where F·X>GNRTN(n), an object of high reflectance is expected to exist at a position corresponding to X; and, in an area where F·X<GNRTN(n), an object of low reflectance is expected to exist at the position corresponding to X.

Figure 12:
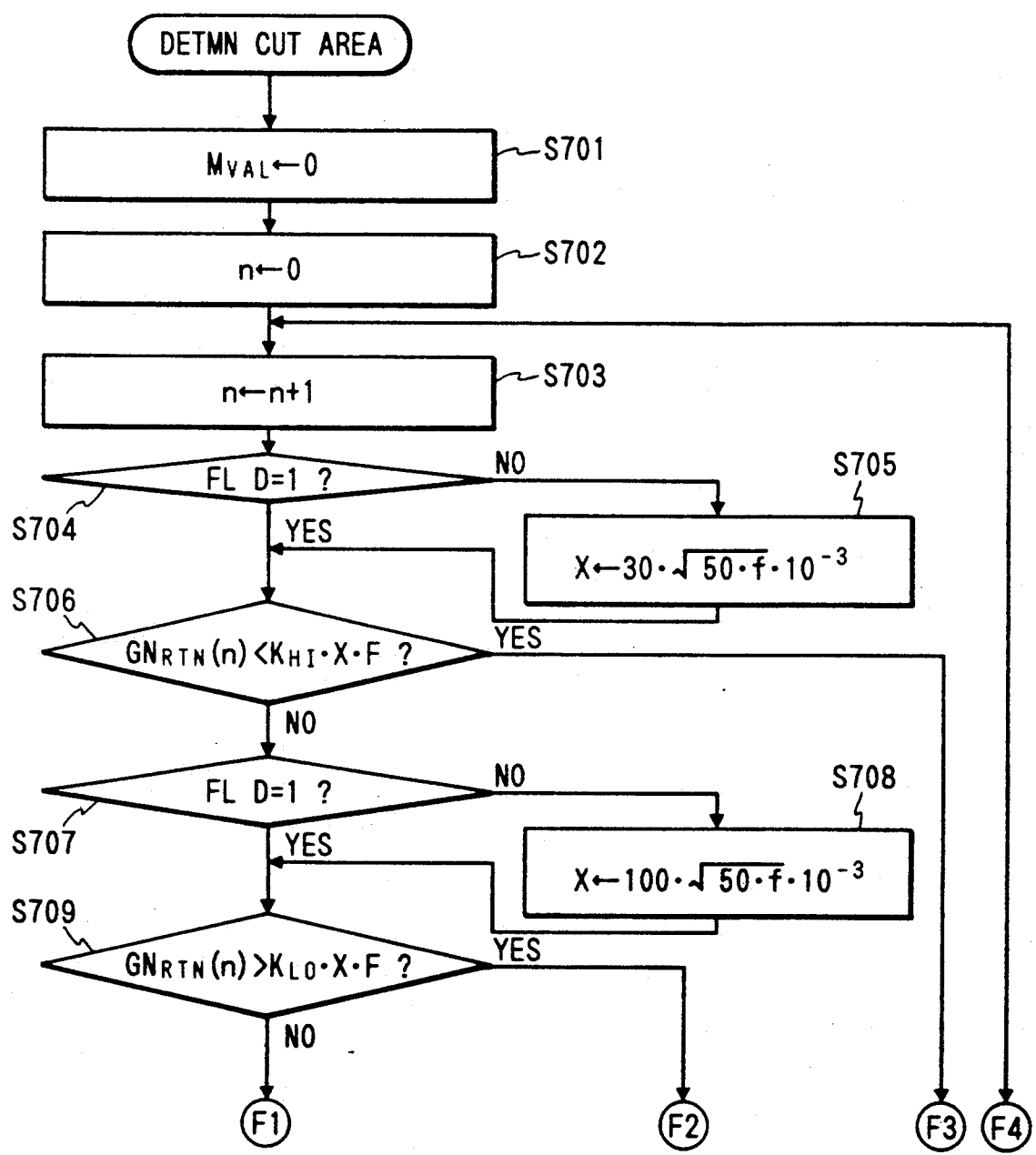
FIG. 12 is a flowchart showing a sub-routine for determining Hi and Lo cut areas (step S519 of FIG. 10)
Figure 13:
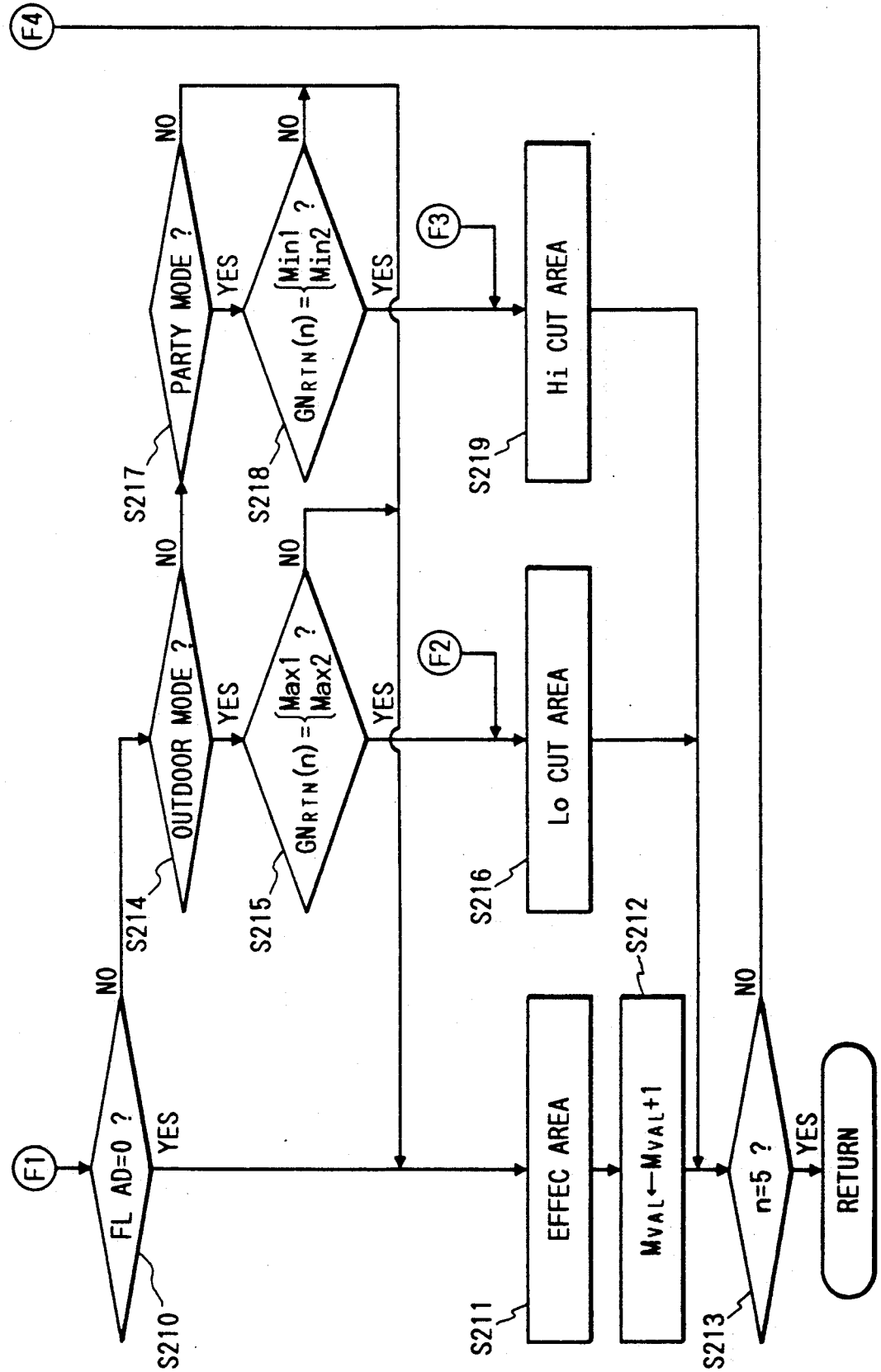
FIG. 13 is a flowchart showing a sub-routine for determining Hi and Lo cut areas (step S519 of FIG. 10)

FIGS. 12 and 13 are flowcharts showing subroutines for determining Hi and Lo cut areas (step S519 of FIG. 10). First, in steps S701 and S702, the variables MVAL and n are initialized to 0. Then, in step S703, 1 is added to n.

In step S704, a judgment is made as to whether the object distance X can be detected (FL D=1) or not. That is, when the setting in step S507 of FIG. 10 is made such that FL D=0, the system concerned is one which cannot detect the photographic distance X, so that the procedure moves to step S706 by way of step S705; when FL D=1, the procedure directly moves on to step S706.

In this step S705, the limit on the nearer side of the normal object distance X as usually obtained by the flash means 11 is set as a pseudo-distance value by using the focal length f (mm), from the following equation:

$$X = 30 \cdot \sqrt{50 \cdot f} \cdot 10^{-3} \text{ [m]}$$

When, for example, the focal length f=24 mm, as shown in FIG. 12, the object distance X is 1.0 m; when the focal length f=50 mm, the object distance X is 1.5 m; and when the focal length f=105 mm, the object distance X is 2.2 m.

In step S706, a judgment is made as to whether the guide number GNRTN (n) is smaller than KHI·F·X or not; if GNRTN (n)<KHI·F·X, it is determined that an object of high reflectance or an object other than the principal subject exists on the nearer side with respect to the position corresponding to the object distance X, and the photometric area in question is regarded as one to be excluded. The procedure then moves on to step S719, where the area is labeled as a Hi-cut area. A "Hi cut" is a process by which the data from those of the divisional photometer elements 13a to 13e which exhibit a photometer value higher than the standard is excluded with respect to calculation so that the photometry may not be affected. Here, KHI is set to a value ranging from approx. 1/√2 to ½.

In steps S707 to S709, a judgment is made, in contrast to steps S704 to S706, as to whether a photometric area is a Lo-cut area or not. That is, in step S707, a judgment is made as to whether the object distance X can be detected (FL D=1) or not. When the setting is so made that FL D=0, the procedure moves to step S709 by way of step S708; when FL D=1, the procedure directly moves on to step S709.

In step S708, the limit on the farther side of the normal object distance X as usually obtained by the flash means 11 is set as a pseudo-distance value by using the focal length f (mm), from the following equation:

$$X = 100 \cdot \sqrt{50 \cdot f} \cdot 10^{-3} \text{ [m]}$$

When, for example, the focal length f=24 mm, the object distance X is 3.5 m; when the focal length f=50 mm, the object distance X is 5.0 m; and when the focal length f=105 mm, the object distance X is 7.2 m.

Next, in step S709, a judgment is made as to whether the guide number GNRTN(n) is larger than KLO·F·X or not; if GNRTN(n)>KLO·F·X, the procedure moves to step S716; and if GNRTN(n)≦KLO·F·X, the procedure moves to step S710.

In step S710, a judgment is made as to whether the photographing condition setting means 37 is OFF (FL AD=0) or not; if it is OFF, the procedure moves on to step S711, and, if it is ON, the procedure moves to step S714.

In step S711, those areas which have been judged to be neither Hi-cut nor L-cut areas are labeled as effective areas, the number of which is expressed as MVAL. In step S712, 1 is added to the number of effective areas, MVAL, and the procedure moves to step S713.

If, in step S710, the photographing condition setting means 37 is ON, the present photographing condition is disciminated at to its type. In this embodiment, it is assumed that the software prepared covers an outdoors mode (steps S714 to S716) and a party mode (steps S717 to S719).

In step S714, a judgment is made as to whether it is the outdoors mode or not; if it is the outdoors mode, the procedure moves on to step S715. In the case of an outdoor flash shot, any incorrect light adjustment for the subject is due to an absence of the background of the subject. Accordingly, the area with the minimum reflected-light quantity at the time of preliminary flashing [GNRTN (n)=Min1] and the area with the second minimum quantity of the same [GNRTN (n)=Min2] are selected and, in step S716, these areas are designated as Lo-cut areas.

When the judgment in step S714 is that it is not the outdoors mode, a judgment is made in step S711 as to whether it is the party mode or not; if it is the party mode, the procedure moves on to step S718; otherwise, the procedure moves to step S711. In the case of a flash shot in a party or the like, any incorrectness in the light adjustment for the principal subject is due to a presence behind the principal subject of an object exhibiting a reflectance higher than that of the principal subject, for example, a gold-leafed folding screen or a mirror. In that case, the area with the maximum quantity of reflected light at the time of preliminary flashing [GNRTN(n)=Max1] and the second maximum quantity of the same [GNRTN(n)=Max1] are selected in step S718, and, in step S719, these areas are designated as Hi-cut areas.

If the photographing condition setting means 37 is OFF in step S710, or if it is neither the outdoors nor the party mode, or if the area has not been designated as a cut area, the area is designated as an effective area in step S711. Afterwards, in step S712, 1 is added to MVAL. This judgment is made on each of the five areas (n=1~5) (steps S702, S703, and S713); then, this sub-routine is terminated.

FIGS. 8A and 8B are flowcharts showing subroutines for determining light adjustment areas and calculating the light-adjustment correction amount (step S520 of FIG. 10). Here, the light-adjustment correction amount ΔY is an amount for determining, in accordance with the field, the criterion of comparison when comparing the sum total of the photometry values with the light adjustment level so as to control the flashing. When ΔY>0, the correction is effected such that the flash quantity increases, and, when ΔY<0, it is effected such that the flash quantity decreases. While in this embodiment the gains on the photometry side are corrected, it is also possible to correct the light adjustment level. No further explanation of the operations of FIGS. 8A and 8B will be given here, since they have already been described.

Figure 14:
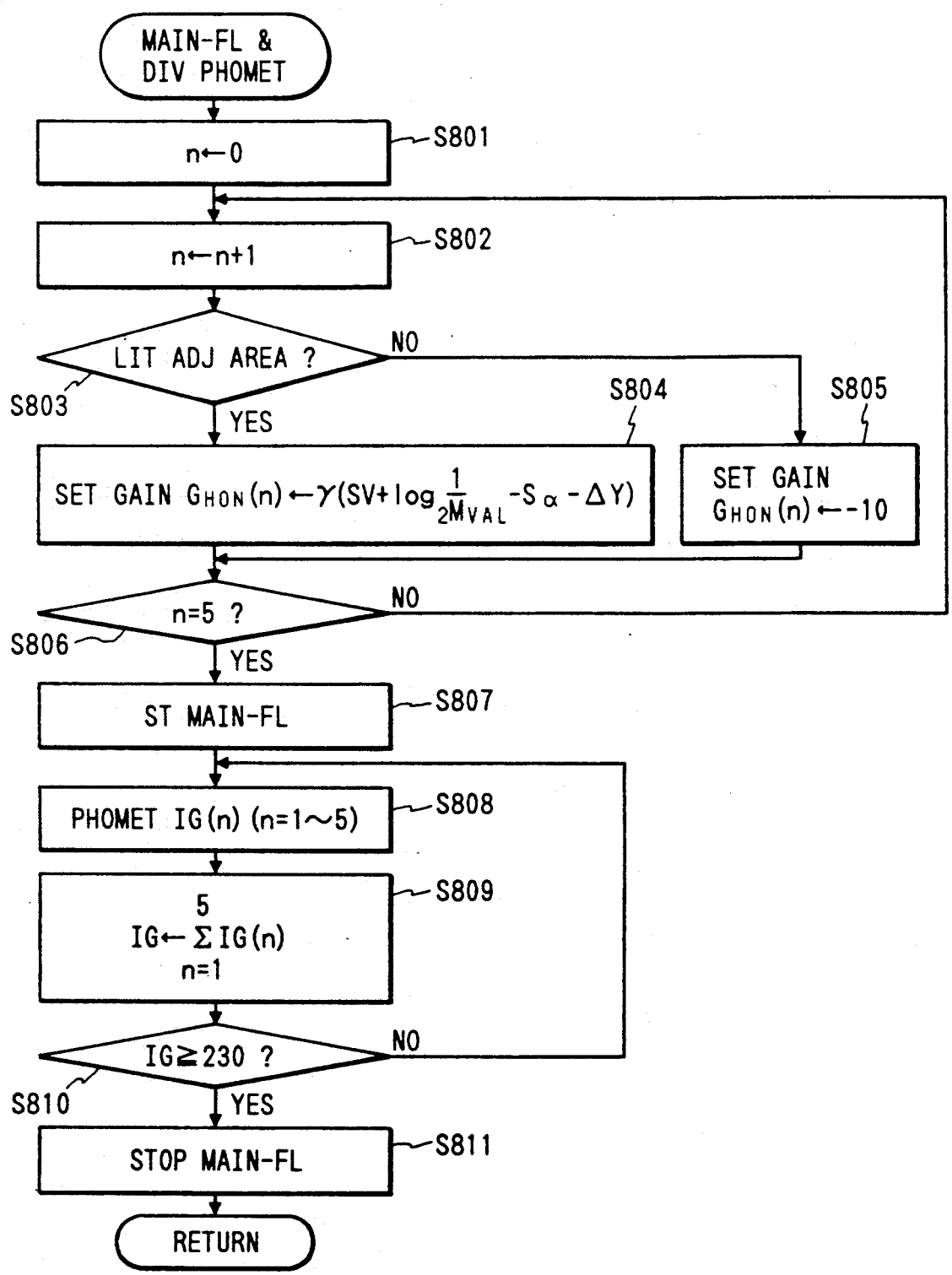
FIG. 14 is a flowchart showing a sub-routine for performing divisional photometry on the reflection from the film surface at the time of main flashing (step S520 of FIG. 10)
Figure 15:
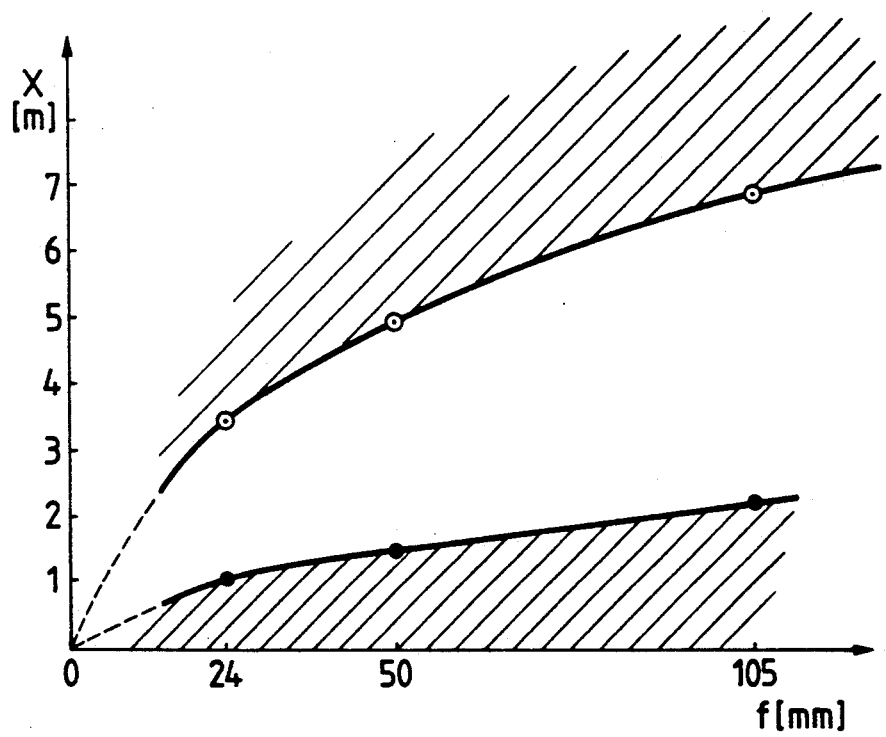
FIG. 15 is a chart showing the relationship between focal length and object distance when determining Hi and Lo cut areas.

FIG. 14 is a flowchart showing a sub-routine for performing divisional photometry on the light reflected by the film surface at the time of main flashing (step S522 of FIG. 10). For each of the five areas (steps S801, S802 and S806), a judgment is made as to whether it is a light adjustment area (step S516 of FIG. 10) or not (step S803). In the case of a light adjustment area, the gain setting of the gain setters 42a to 42e shown in FIG. 4 is performed in accordance with the equation: GHON(n)=γ[SV+log2(1/MVAL)−Sβ−ΔY] (step S804). In the case of a cut area, the gain setting is performed in accordance with GHON (n)=−10 (step S805). Actually, due to the setting of GHON (n)=−10, the photometry value is multiplied by $2^{-10}$, in the case of a cut area, and the output therefrom is ignored.

Main flashing is started (step S807), and the photometry values IG(n) in the areas (n=1~5) are calculated (step S808), and, when the sum total of the photometry values, IG=IG(1)+... +IG(5), which is calculated in step S809, has reached the light adjustment level (230) (step S810), the main flashing is stopped (step S811), and this sub-routine is terminated.

Figure 16:
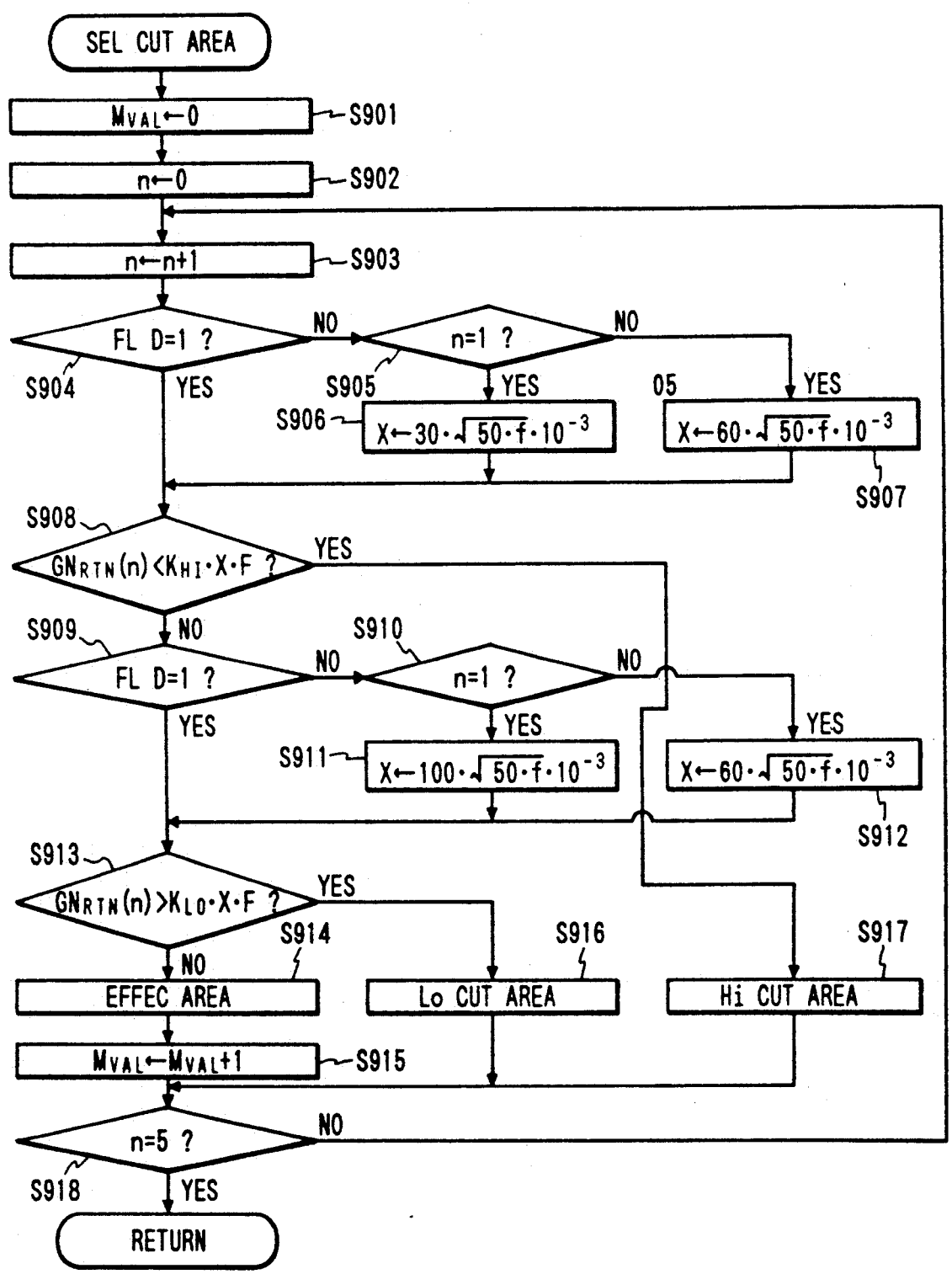
FIG. 16 is a flowchart showing a sub-routine for determining Hi and Lo cut areas in another embodiment (step S519 of FIG. 10).

FIG. 16 is a flowchart showing another embodiment of the sub-routine for determining Hi and Lo cut areas (step S19 of FIG. 10). First, in steps S901 and S902, the number of effective areas, MVAL, and n are initialized to 0.

In step S903, 1 is added to n, and, in step S904, a judgment is made as to whether the flag FL D is 1 or not. If the flag FL D is not 1, it implies that the object distance X has not been detected.

If the flag FL D is 1, i.e., if the object distance X has been detected, the object distance X can be directly measured, so that the procedure moves on to step S908. When the flag FL D is not 1, the procedure moves to step S905, where a judgment is made as to whether n=1 or not. If the variable n is 1 in step S905 (in which case the central portion constitutes the object of calculation), the procedure moves on to step S906, where $$30 \cdot \sqrt{50 \cdot f} \cdot 10^{-3}$$

is substituted for X, the procedure moving on to step S908.

When the variable n is not 1 (i.e., the central portion does not constitues the object of calculation), the procedure moves on to step S907, where $$60 \cdot \sqrt{50 \cdot f} \cdot 10^{-3}$$

is substituted for X, the procedure moving on to step S908.

In step S908, a judgment is made as to whether the GNRTN(n), calculated in step S610 (FIG. 11), is smaller than KHI·F·X or not; if GNRTN(n)<KHI·F·X, it is determined that an object of high reflectance, such as a gold-leafed folding screen or a mirror, exists in that area, or that an object (other than the principal subject) exists on the nearer side with respect to the position corresponding to the object distance X, and the procedure moves on to step S918; and that photometric area is labeled as a Hi-cut area candidate, the procedure moving on to step S918. If GNRTN(n)>KHI·F·X, the procedure moves on to step S909.

Even when no object distance X can be detected, using in step S908 the value obtained in step S906 or S907 will result, insofar as the value of GNRTN (n) is obviously very small, in an object of high reflectance being assumed to exist in the area, which will then be regarded as a Hi-cut area candidate.

Further, it is so arranged that the value obtained in step S906 is smaller than that obtained in step S907. This is due to the fact that it is quite probable for the principal object to exist in the central portion; thus, it is expedient to make it more difficult for the central portion to be selected as a Hi-cut area as compared to the peripheral portions, thereby reducing the probability of the central portion being cut.

In step S909, a judgment is made as to whether the flag FL D is 1 or not. If the flag FL D is 1, the procedure moves on to step S913. If the flag FL D is not 1, the procedure moves on to step S910. When, in step S910, the variable n=1 (in which case the central portion constitutes the object of calculation), the procedure moves on to S911, where $$100 \cdot \sqrt{50 \cdot f} \cdot 10^{-3}$$

is substituted for X, the procedure moving on to step S913.

When the variable n is not 1 (in which case the central portion does not constitutes the object of calculation), the procedure moves on to step S912, where $$60 \cdot \sqrt{50 \cdot f} \cdot 10^{-3}$$

is substituted for X, the procedure moving on to step S913.

In step S913, a judgment is made as to whether the GNRTN(n), calculated in step S610 (FIG. 11), is larger than KLO·F·X or not; if GNRTN(n)>KLO·F·X, it is determined that an object of low reflectance exists in that area; for example, the background is missing. Then, the procedure moves on to step S916, and the photometric area concerned is regarded as a Lo-cut area candidate, the procedure moving on to step S918.

Here, the areas which are selected as Hi-cut area candidates or Lo-cut area candidates correspond to the ones which are to be excluded with respect to light adjustment.

Even when the object distance X cannot be detected, using the value obtained in step S911 or S912 results in an object of low reflectance being assumed to exist, insofar as the value of GNRTN(n) is obviously very large; the area being regarded as a Lo-cut area candidate.

Further, it is so arranged that the value obtained in step S911 is smaller than that obtained in step S912. This is due to the fact that it is quite probable for the principal subject to exist in the central portion; thus, it is expedient to make it more difficult for the central portion to be selected as a Lo-cut area as compared to the peripheral portions, thereby reducing the probability of the central portion being cut.

Further, if the results of steps S908 and S913 are both negative, the area is regarded as an effective area candidate, i.e., one on which light adjustment may be performed (step S914), and, in step S915, 1 is added to the number of effective areas, MvAL, the procedure moving on to step S918. The operation of step S918 is repeated until the variable n becomes 5 (step S903); when the calculation has been performed for all the areas, this sub-routine is terminated.

In accordance with the process of FIG. 16, described above, when the GNRTN(n), calculated on the basis of the photometry signals of the photometry areas at the time of preliminary flashing, is smaller than KHI·F·X, the area is regarded as a Hi-cut area candidate; when GNRTN(n)>KLO·F·X, the area is regarded as a Lo-cut area candidate. When KHI·F·X≦GNRTN(n)≦KLO·F·X, the area is regarded as an effective area candidate. Thus, those photometric areas whose photometry signal levels are within a fixed range are regarded as ones which may be selected as effective areas, and those whose photometry signal levels are out of the fixed range are regarded as non-light-adjustment areas. Accordingly, a fixed range is regarded as the object of light adjustment and it is possible to exclude a reflection of an excessively high or low luminance with respect to light adjustment, whereby the exposure can be adjusted to the principal subject with a high level of precision.

The above-described embodiments should not be construed as restrictive; various modifications are possible within the scope of this invention. For example, while in the above embodiments a pseudo-distance value based on the focal length was used when the object distance could not be detected, it is also possible to adopt a value based on the exit pupil distance, etc.

As has been described in detail, this invention makes it possible to extract cut areas even when the object distance cannot be detected, so that those areas which will adversely affect the light adjustment at the time of main flashing can be cut, whereby an appropriate flashing can be effected.

What is claimed is:

1. An automatic light adjustment device for cameras comprising:

a flashing means capable of effecting a preliminary and a main flashing;

a photometry means, which performs divisional photometry on a field divided into a plurality of areas at the time of the preliminary and main flashing of said flashing means, emitting photometry signals respectively corresponding to these areas;

an area setting means, which makes a judgment, for each of said plurality of areas, as to whether the level of the corresponding photometry signal at the time of said preliminary flashing is within a fixed range or not, judging the area to be one on which light adjustment is to be performed (an light-adjustment area) when the signal level is within said range, and judging it to be one which is to be excluded with respect to light adjustment (a non-light-adjustment area) when the signal level is out of said range;

a discrimination means, which makes a judgment, for each of any non-light-adjustment areas detected, as to whether the level of the corresponding photometric signal at the time of said preliminary flashing is above or below said fixed range; and a light adjustment means, which determines a light adjustment condition for stopping said main flashing on the basis of the judgment results obtained by said discrimination means, stopping the main flashing when the photometry signals of said light-adjustment areas at the time of the main flashing have satisfied said light adjustment condition.

2. An automatic light adjustment device for cameras as claimed in claim 1, wherein said light adjustment means corrects the photometry signals corresponding to said light-adjustment areas at the time of the main flashing in accordance with the judgment results obtained by said discrimination means, stopping said main flashing when the sum total of the signals thus corrected has reached a predetermined light adjustment level.

3. An automatic light adjustment device for cameras as claimed in claim 1, wherein said light adjustment means determines a light adjustment level in accordance with the judgment results obtained by said discrimination means, stopping said main flashing when the sum total of the photometry signals corresponding to said light-adjustment areas at the time of the main flashing has reached the predetermined light adjustment level.

4. An automatic light adjustment device for cameras as claimed in claim 1, wherein said light adjustment means performs adjustment such that the time at which said main flashing is stopped becomes later than usual when it is judged by said discrimination means that the level of the photometry signal of any non-light-adjustment area at the time of said preliminary flashing is above said fixed range.

5. An automatic light adjustment device for cameras as claimed in claim 1, wherein said light adjustment means performs adjustment such that the time at which said main flashing is stopped becomes earlier than usual when it is judged by said discrimination means that the level of the photometry signal of any non-light adjustment area at the time of said preliminary flashing is below said fixed range.

6. An automatic light adjustment device for cameras comprising:
 a flashing means capable of effecting a preliminary and a main flashing;
 a photometry means, which performs divisional photometry on a field divided into a plurality of divisional areas at the time of the preliminary and main flashing of said flashing means, emitting photometry signals respectively corresponding to these areas;
 a first area setting means, which makes a judgment, for each of said plurality of areas, as to whether the level of the corresponding photometry signal at the time of said preliminary flashing is within a fixed range or not, judging the area to be one on which light adjustment is to be performed (an light-adjustment area) when the signal level is within said range, and judging it to be one which is to be excluded with respect to light adjustment (a non-light-adjustment area) when the signal level is out of said range;
 a second area setting means, which, when all of said divisional areas are non-light-adjustment areas, judges that area among them to be a light-adjustment area whose photometry signal level at the time of said preliminary flashing is closest to said fixed range; and
 a light adjustment means, which stops the main flashing when the sum total of the photometry signals corresponding to said light-adjustment areas at the time of said main flashing has reached a predetermined light adjustment level after the start of said main flashing.

7. An automatic light adjustment device for cameras as claimed in claim 6, further comprising:
 a discrimination means, which makes a judgment, for each of any non-light-adjustment areas detected, as to whether the level of the corresponding photometric signal at the time of said preliminary flashing is above or below said fixed range;
 said light adjustment means changing the time at which the main flashing is stopped in accordance with the judgment results obtained by said discrimination means when all of said divisional areas are non-light-adjustment areas.

8. An automatic light adjustment device for cameras comprising:
 a flashing means capable of effecting a preliminary and a main flashing;
 a photometry means, which performs divisional photometry on a field divided into a plurality of areas at the time of the preliminary and main flashing of said flashing means, emitting photometry signals respectively corresponding to these areas;
 a control means, which stops the main flashing when the sum total of amounts corresponding to the photometry values obtained by performing photometry by said photometry means on the reflected light at the time of the main flashing has reached a predetermined reference value; and
 a first cut-area determining means, which compares the photometry values obtained by performing photometry by said photometry means on the reflected light at the time of said preliminary flashing with values which are related to a predetermined pseudo-distance value that is not a measured value, determining, on the basis of the results of tee comparison, areas which are to be excluded with respect to light adjustment at the time of the main flashing.

9. An automatic light adjustment device for cameras as claimed in claim 8, further comprising:
 a judgment means, which makes a judgment as to whether object distance measurement can be performed or not; and
 a means, which, when it is judged by said judgment means that object distance measurement can be performed, compares the photometry values obtained by performing photometry by said photometry means on the reflected light at the time of the preliminary flashing with a value related to the object distance, which is a measured value, and determines, on the basis of the results of the comparison, areas which are to be excluded with respect to light adjustment at the time of the main flashing.

10. An automatic light adjustment device for cameras as claimed in claim 8, wherein said pseudo-distance value is a value which is determined on the basis of the focal length or the exit pupil distance of the photographic lens used.

11. An automatic light adjustment device for cameras comprising:

a flashing means capable of effecting a preliminary and a main flashing;

a photometry means, which performs divisional photometry on a field divided into a plurality of areas consisting of central and peripheral portions, at the time of the preliminary and main flashing of said flashing means, emitting photometry signals respectively corresponding to these areas;

a control means, which stops the main flashing when the sum total of amounts corresponding to the photometry values obtained by performing photometry by said photometry means on the reflected light at the time of the main flashing has reached a predetermined reference value; and a cut-area determining means, which compares the photometry values obtained by performing photometry by said photometry means on the reflected light of said central and peripheral portions at the time of said preliminary flashing with values which are related to first and second predetermined pseudo-distance values that are not measured values, determining, on the basis of the results of the comparison, areas which are to be excluded with respect to light adjustment at the time of the main flashing.

12. An automatic light adjustment device for cameras as claimed in claim 11, further comprising:

a judgment means, which makes a judgment as to whether object distance measurement can be performed or not; and a means, which, when it is judged by said judgment means that object distance measurement can be performed, compares the photometry values obtained by performing photometry by said photometry means on the reflected light at the time of the preliminary flashing with a value related to the object distance, which is a measured value, and determines, on the basis of the results of the comparison, areas which are to be excluded with respect to light adjustment at the time of the main flashing.

13. An automatic light adjustment device for cameras as claimed in claim 11, wherein said pseudo-distance values are values which are determined on the basis of the focal length or the exit pupil distance of the photographic lens used.

14. An automatic light adjustment device for cameras comprising:

a flashing means capable of effecting a preliminary and a main flashing;

a photometry means, which performs divisional photometry on a field divided into a plurality of areas consisting of central and peripheral portions at the time of the preliminary and main flashing of said flashing means;

a control means, which stops the main flashing when the sum total of amounts corresponding to the photometry values obtained by performing photometry by said photometry means on the reflected light at the time of the main flashing has reached a predetermined reference value;

a photographing condition setting means, which sets a predetermined optimum photographing condition in accordance with the type of photographing; and a cut-area determining means, which, on the basis of the setting by said photographing condition setting means, selects areas which are to be excluded with respect to light adjustment at the time of the main flashing in accordance with the photometry values obtained by said photometry means at the time of the preliminary flashing.

15. An automatic light adjustment device for cameras as claimed in claim 14, further comprising:

a judgment means, which makes a judgment as to whether object distance measurement can be performed or not; and a means, which when it is judged by said judgment means that object distance measurement can be performed, compares the photometry values obtained by performing photometry by said photometry means on the reflected light at the time of the preliminary flashing with a value related to the object distance, which is a measured value, and determines, on the basis of the results of the comparison, areas which are to be excluded with respect to light adjustment at the time of the main flashing.

16. An automatic light adjustment device for cameras as claimed in claim 14, wherein said pseudo-distance value is a value which is determined on the basis of the focal length or the exit pupil distance of the photographic lens used.

* * * * *